(12) United States Patent
Nory et al.

(10) Patent No.: US 11,317,353 B2
(45) Date of Patent: Apr. 26, 2022

(54) BEAM INDICATION FOR UPLINK POWER CONTROL

(71) Applicant: Telefonaktiebolaget LM Ericsson (publ), Stockholm (SE)

(72) Inventors: Ravikiran Nory, San Josè, CA (US); Stephen Grant, Pleasanton, CA (US); Claes Tidestav, Bålsta (SE); Niklas Wernersson, Kungsängen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/645,724

(22) PCT Filed: Sep. 11, 2018

(86) PCT No.: PCT/IB2018/056935
§ 371 (c)(1),
(2) Date: Mar. 9, 2020

(87) PCT Pub. No.: WO2019/049107
PCT Pub. Date: Mar. 14, 2019

(65) Prior Publication Data
US 2020/0305088 A1    Sep. 24, 2020

Related U.S. Application Data

(60) Provisional application No. 62/557,018, filed on Sep. 11, 2017.

(51) Int. Cl.
| | | |
|---|---|---|
| H04W 52/08 | (2009.01) | |
| H04W 52/14 | (2009.01) | |
| H04B 7/06 | (2006.01) | |
| H04L 5/00 | (2006.01) | |
| H04L 25/02 | (2006.01) | |
| H04W 52/24 | (2009.01) | |
| H04W 52/42 | (2009.01) | |

(Continued)

(52) U.S. Cl.
CPC ........ *H04W 52/146* (2013.01); *H04B 7/0626* (2013.01); *H04L 5/0051* (2013.01);
(Continued)

(58) Field of Classification Search
CPC ... H04W 52/146; H04W 52/08; H04W 52/10; H04W 52/325; H04W 72/0473;
(Continued)

(56) References Cited

U.S. PATENT DOCUMENTS

| | | | |
|---|---|---|---|
| 2019/0069285 A1* | 2/2019 | Chandrasekhar | .... H04B 7/0695 |
| 2019/0190747 A1* | 6/2019 | Park | ...................... H04L 5/0057 |

FOREIGN PATENT DOCUMENTS

| | | |
|---|---|---|
| RU | 2 573 643 C2 | 1/2016 |
| WO | 2017146755 A1 | 8/2017 |
| WO | 2018083253 A1 | 5/2018 |
| WO | 2018231124 A1 | 12/2018 |
| WO | 2019032020 A1 | 2/2019 |

OTHER PUBLICATIONS

International Search Report and Written Opinion issued in International Application No. PCT/IB2018/056935 dated Nov. 16, 2018 (12 pages).

(Continued)

*Primary Examiner* — Tu X Nguyen
(74) *Attorney, Agent, or Firm* — Rothwell, Figg, Ernst & Manbeck, P.C.

(57) ABSTRACT

A user equipment (UE) being configured to receive a downlink, DL, information; determine a spatial association for an uplink, UL, transmission based on the DL information; and determine UL power control, PC, parameters based on the DL information.

24 Claims, 17 Drawing Sheets

(51) Int. Cl.
 *H04W 56/00* (2009.01)
 *H04W 72/04* (2009.01)
(52) U.S. Cl.
 CPC ....... *H04L 25/0226* (2013.01); *H04W 52/242* (2013.01); *H04W 52/42* (2013.01); *H04W 56/001* (2013.01); *H04W 72/042* (2013.01)
(58) Field of Classification Search
 CPC ..... H04W 52/54; H04W 52/38; H04W 52/00; H04W 52/04; H04W 52/06; H04B 7/0617; H04B 7/0626; H04B 7/088; H04B 7/0408
 See application file for complete search history.

(56) References Cited

OTHER PUBLICATIONS

Guangdong OPPO Mobile Telecom, "Uplink power control mechanism for NR", 3GPP TSG RAN WG1 Meeting #90, R1-1713246, Prague, Czech, Aug. 21-25, 2017 (3 pages).
ZTE, "On NR power control", 3GPP TSG RAN WG1 Meeting #90, R1-1712312, Prague, Czech, Aug. 21-25, 2017 (9 pages).
Huawei et al., "General considerations on UL power control design", 3GPP TSG RAN WG1 Meeting NR#3, R1-1715478, Nagoya, Japan, Sep. 18-21, 2017 (8 pages).
LG Electronics, "Consideration on UL power control process for NR", 3GPP TSG RA WG1 Meeting #90, R1-1713223, Prague, Czech Republic, Aug. 21-25, 2017 (9 pages).

* cited by examiner

| TCI State | RS Set(s) | Used for PDCCH QCL Indication | Used for PDSCH QCL Indication |
|---|---|---|---|
| 0 | {Set $1_0$} | Y | Y |
| 1 | {Set $1_1$} | Y | Y |
| 2 | {Set $1_2$} | Y | Y |
| 3 | {Set $1_3$, Set $2_3$} |  | Y |
| ... | ... |  | ... |
| $2^N-1$ | {Set $1_{2^N-1}$, Set$2_{2^N-1}$} |  | Y |

← Default TCI state

FIG. 17

BEAM INDICATION FOR UPLINK POWER CONTROL

CROSS REFERENCE TO RELATED APPLICATION(S)

This application is a 35 U.S.C. § 371 National Stage of International Patent Application No. PCT/IB2018/056935, filed Sep. 11, 2018, designating the United States and claiming priority to U.S. provisional application No. 62/557,018, filed on Sep. 11, 2017. The above identified applications are incorporated by reference.

TECHNICAL FIELD

Disclosed are embodiments for beam indication for uplink power control.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The large variety of requirements for the next generation of mobile communications system (5G or New Radio, NR) implies that frequency bands at many different carrier frequencies will be needed. For example, low bands will be needed to achieve sufficient coverage and higher bands (e.g. mmW, i.e. near and above 30 GHz) will be needed to reach the required capacity. At high frequencies the propagation properties are more challenging and high order beamforming at the base station will be required to reach a sufficient link budget.

NR will have a beam centric design, which means that the traditional cell concept is relaxed and UEs will in many cases be connected to and perform "handover" between narrow beams instead of cells. Hence, 3GPP has agreed to introduce concepts for handling mobility between beams (both within and between TRPs). At higher frequencies, where high-gain beamforming will be needed, each beam will only be optimal within a small area and the link budget outside the optimal beam will deteriorate quickly. Hence, frequent and fast beam switching methods are needed to maintain high performance (so called beam management). For the downlink data channel (PDSCH), it has been agreed to introduce a beam indicator in the scheduling downlink control information (DCI) message that informs the UE which beam is used so that the UE can adjust its receive beam accordingly. For the downlink control channel (PDCCH), it has been agreed to introduce a beam indicator in a separate control message carried by the MAC layer (MAC-CE). See also Section 2.1.2. It is especially important in case of analog RX beamforming, as the UE needs to know before that data arrives, in which direction to point the RX beam.

To perform measurement of channel quality of a certain beam, a beamformed reference signal is introduced. This can be a channel state information RS (CSI-RS) or a synchronization signal block (SSBlock). Beamforming implies transmitting the same signal from multiple antenna elements of an antenna array with an amplitude and/or phase shift applied to the signal for each antenna elements. These amplitude/phase shifts are commonly denoted as the antenna weights and the collection of the antenna weights for each of the antennas is a precoding vector.

Different precoding vector give rise to a beamforming of the transmitted signal and the weights can be controlled so that the signals are coherently combining in a certain angle direction as seen from the antenna array in which case it is said that a beam is formed in that direction. If the antennas of the array are placed in two dimensions, i.e. in a plane, then the beam can be steered in both azimuth and elevation directions with respect to the plane perpendicular to the antenna array.

Note that while the term beam is used in this disclosure, there are other precoding vectors that give a transmission that is matched to the channel and which does not give a beam in a strict sense. For instance, if the channel is known at the TRP, the precoding weight can be controlled so that the signal strength is maximized the UE, instead of forming a beam to give the maximal array gain in a certain direction. Matched channel precoding is optimal in maximizing the signal power at the receiver, but it requires accurate channel information. In line of sight channels however, the use of a beam is near optimal.

In NR it is proposed that CSI-RS is used as reference signal for beam management but also other signals such as SSBlocks is being considered. SSBlocks are periodic in nature, e.g., a beam sweep of up to 64 beams (one per SSB) is performed every 20 ms (see also Section 2.1.5). In contrast, CSI-Rs can be either triggered aperiodically or configured to be periodic in nature. In the most general case, a UE can be configured to measure on any combination of periodic SSB, periodic CSI-RS, and aperiodic CSI-RS for the purposes of beam management. The network (NW), NR base station (gNB) or another node will configure the UE with a CSI-RS configuration by a control message such as a radio resource control (RRC) message, where each configuration will contain one or multiple CSI-RS resources. One or multiple UEs will then perform measurements on these CSI-RS resources and report the result back to the network.

Measurements for Beam Management

In an embodiment, each CSI-RS resource or SSB is transmitted in a different TRP TX beam (i.e. with a different multi-antenna precoding weight to form beams in different directions as seen from the TRP antenna array).

The UE is configured to perform channel quality measurements (such as reference signal received power (RSRP)) on the particular reference signal (CSI-RS or SSB) corresponding to the different TRP TX beams and it may further be configured to report back these measurements to the NW. In this way it is possible, by using the measurement report(s), for the NW to find a preferred TRP TX beam(s) for a given UE. In another use case, each CSI-RS resource is transmitted in the same TRP TX beam.

In this way the UE can evaluate different UE RX beams for the used TRP TX beam, and find a preferred UE RX beam for the particular TRP TX beam. The repeated transmission of the CSI-RS resource in the same beam, in e.g.

different OFDM symbols or using a frequency-domain comb resulting in a time-domain repetition pattern, is useful for example when analog receive beamforming is applied at the UE since the UE can then switch RX beam between or within the OFDM symbols and evaluate the link quality.

The CSI-RS transmission can be either aperiodic (for example event triggered) or transmitted in a semi-persistent/periodic manner. In case the CSI-RS transmissions is transmitted in a semi-persistent/periodic manner also the measurement reports can be configured in a semi-persistent/periodic manner.

Using the measurement procedures described above, the UE can find a preferred TRP TX beam and for that beam a preferred UE RX beam. The TX-RX beam pair is sometimes referred to as a beam pair link (BPL).

Signaling for Beam Management

For NR, it has been agreed that for reception of unicast DL data channel (PDSCH), NR supports indication of spatial QCL assumption between DL RS antenna port(s) and DMRS antenna port(s) of DL data channel: Information indicating the RS antenna port(s) is indicated via DCI (downlink grants), i.e. UE specific indication. The information indicates the RS antenna port(s) which is QCL-ed with DMRS antenna port(s) and spatial QCL means "spatial quasi-co-location" and it can be interpreted as the DL RS and DMRS can be received in a spatially equivalent way at the UE, in other words using the same spatial filter, spatial precoder or beam.

It has been further agreed that NR supports a similar indication of spatial QCL assumption for the reception of a user-specific DL control channel (PDCCH), except that the indication is to be contained in a MAC Control Element (MAC-CE) (L2 signaling) in contrast to a DCI message (L1 signaling).

Mechanisms for Control Signaling

LTE control signaling can be carried in a variety of ways, including carrying control information on PDCCH or PUCCH, embedded in the PUSCH, in MAC control elements ('MAC CEs'), or in RRC signaling. Each of these mechanisms is customized to carry a particular kind of control information.

Control information carried on PDCCH, PUCCH, or embedded in PUSCH is physical layer related control information, such as downlink control information (DCI), uplink control information (UCI), as described in 3GPP TS 36.211, 36.212, and 36.213 for LTE and 38.211, 38.212, 38.213 and 38.214 for NR. DCI is generally used to instruct the UE to perform some physical layer function, providing the needed information to perform the function. UCI generally provides the network with needed information, such as HARQ-ACK, scheduling request (SR), channel state information (CSI), including CQI, PMI, RI, and/or CRI. UCI and DCI can be transmitted on a subframe-by-subframe basis, and so are designed to support rapidly varying parameters, including those that can vary with a fast fading radio channel. Because UCI and DCI can be transmitted in every subframe, UCI or DCI corresponding to a given cell tend to be on the order of tens of bits, in order to limit the amount of control overhead.

Control information carried in MAC CEs is carried in MAC headers on the uplink and downlink shared transport channels (UL-SCH and DL-SCH), as described in 3GPP TS 36.321. Since a MAC header does not have a fixed size, control information in MAC CEs can be sent when it is needed, and does not necessarily represent a fixed overhead. Furthermore, MAC CEs can carry larger control payloads efficiently, since they are carried in UL-SCH or DL-SCH transport channels, which benefit from link adaptation, HARQ, and can be LDPC coded. MAC CEs are used to perform repetitive tasks that use a fixed set of parameters, such as maintaining timing advance or buffer status reporting, but these tasks generally do not require transmission of a MAC CE on a subframe-by-subframe basis. Consequently, channel state information related to a fast fading radio channel, such as PMI, CQI, RI, and CRI are not carried in MAC CEs in LTE up to Rel-14.

Measurements for initial access and beam management in NR For NR, it has been agreed that a synchronization signal block (SSB) is to be used for synchronization purposes during initial access. The SSB is comprised of a primary synchronization (PSS), a secondary synchronization signal (SSS), and a physical broadcast signal (PBCH) carrying essential system information. The SSB is transmitted periodically with a period of 20 ms, and multiple SSBs may be transmitted within each period, each with a different time index. Within a period, each SSB may be beamformed in a different direction such that the SSB is transmitted in a "beam sweeping" manner over the coverage area of a sector. When a UE performs initial access to the system, it continually "listens" for an SSB, and when it detects the strongest one, it performs a random access procedure (RACH) using PRACH resources that are associated with the particular time index contained in the detected PBCH. In this way, when the gNB detects the UEs PRACH, it implicitly knows which SSB, and thus which Tx beam the UE detected. This gives the gNB some information about an initial coarse beam direction to use for UE-specific beam forming of later data/control channel transmissions.

Since the SSBs are transmitted in a beam sweeping manner, and can be used to detect a suitable Tx beam for a user, it is being discussed whether or not SSB should be used more broadly for beam management purposes. One aspect being discussed is for the gNB to configure the UE to report L1-RSRP measurements based on one or more SSB on a regular basis. These may be used to track the direction of a UE as it moves/rotates. Furthermore, these measurements may be used in tandem with measurements on CSI-RS to further refine the beam direction on a UE-specific basis.

Robust Beam Management

One problem with connecting UEs to narrow beams is that the BPL could easily be deteriorated for example if an object gets in the way of the link and blocks it. Due to high penetration loss and poor diffraction properties at high frequencies a blocking object can lead to lost connection between the TRP and UE (so called a beam link failure (BLF) or BPL failure (BPLF)), which might lead to dropped calls and bad user experience.

One way to mitigate the problem of BPLFs is to use a second, backup BPL between the TRP and the UE that can be used in case the first, link is blocked. Since the second link is a backup link, the second link is denoted as a monitored link while the first link is the active link, as illustrated in FIG. 1 which shows the use of active and monitored beam links for communications between a TRP 104 and a UE 102. In the top picture of FIG. 1. there is an active BPL between the TRP 104 and the UE 102 used for control signaling and data transmission and one monitored BPL used as backup. In the middle picture an object 190 is blocking the active link which ruins the active link connection between the TRP 104 and the UE 102. To restore the connection between the TRP 104 and the UE 102 the NW switches the active link to the monitored link, as illustrated in the lower picture.

The purpose of the monitored link is to 1) discover new links that are better than the active link, 2) have a backup link in case the active link is broken. In FIG. 1, there is one UE RX beam 116, 118 associated with each TRP TX beam 112, 114, which typically is the case if analog or hybrid receive beamforming is used at the UE 102. In the case the UE 102 uses pure analog receive beamforming, the UE 102 can only tune its receive beam to one TRP transmit beam at a time, e.g. per OFDM symbol. Likewise, if the TRP 104 uses analog transmit beamforming, only one beam can be transmitted at a time, e.g. per OFDM symbol. Hence, there is a need to align the transmit beam with the correct receive beam at a given time. For each TRP TX beams, at a given point in time, there is an "optimal" UE RX beam associated with it, among the set of possible UE RX beams.

Beam Indication

In the 3GPP TSG RAN WG1 #90 Meeting (21-25 Aug. 2017) the following agreement was made related to beam indication for the downlink (DL) data channel PDSCH:

---
Agreement #1:
---
For the purposes of beam indication for at least NR unicast PDSCH, support an N-bit indicator field in DCI which provides a reference to a DL RS which is spatially QCL'd with at least one PDSCH DMRS port group
    An indicator state is associated with at least one index of a DL RS (e.g., CRI, SSB Index) where each index of downlink RS can be associated with a given DL RS type, e.g., aperiodic CSI-RS, periodic CSI-RS, semi-persistent CSI-RS, or SSB,
        Note: L1-RSRP reporting on SSB is not yet agreed
        Note: One possibility to determine DL CSI-RS type is through the resource setting ID, other options are not precluded
    The value of N is FFS, but is at most [3] bits
    FFS: The case of more than one DMRS port group
    FFS: Whether or not to indicate more than one beam indicator, NR strive to minimize the indicator overhead
FFS: Signalling mechanism for the association of a DL RS index (e.g., CRI, SSB index) to an indicator state, e.g.,
    The association is explicitly signaled to the UE
    The association is implicitly determined by the UE
    Combination of the above is not precluded
FFS: An indicator state may or may not also include other parameter(s), e.g., for PDSCH to RE mapping purposes analogous to PQI in LTE, other QCL parameters
FFS: Whether or not an indicator state may be associated with more than one DL RS index
FFS: PDCCH beam indication may or may not be based on the beam indication states for PDSCH
---

The purpose of signaling a beam related indicator to the UE in either DCI (e.g., for PDSCH) or MAC-CE (e.g., for PDCCH) is to help the UE to set its analog Rx beam. As such, this indicator can be seen as a spatial QCL indicator. For the purpose of explanation, the current disclosure adopts the terminology QRI (QCL Reference Indictor) to refer to the beam related indicator that is signaled to the UE. The QRI informs the UE about which particular reference signal resource (SSB, p-CSI-RS, a-CSI-RS), the DMRS is spatially quasi-co-located (QCL) with, for the purposes of PDSCH/PDCCH reception. If two transmitted RSs are spatial QCL at the receiver, then the receiver can assume that the first and second transmitted RS is transmitted with approximately the same beam pattern, and therefore the receiver can use approximately the same RX beam to receive the second reference signal it used to receive the first reference signal. Hence, spatial QCL is a term adopted in 3GPP to assist the use of analog beamforming and formalize the use of "same beam" over different time instances. This in turn enables the gNB to inform the UE that a previously transmitted RS, which is indicated by QRI in a DCI message, is spatially QCL with the PDSCH DMRS that is scheduled by the same DCI message.

To be flexible in scheduling different beams and/or transmission points, the QRI can point one out of several different RS transmissions (e.g. several different beams) that has happened in the past. One way to describe this is with a list, e.g. a 2 bit QRI indicator and a list with 4 entries. Hence, the QRI signaled to the UE in a downlink control message (DCI or MAC-CE) is drawn from a list of QRI entries (or states) where the list is comprised both of entries with an association to a periodically transmitted RS (e.g., SSB and/or p-CSI-RS) and entries with an association to an aperiodically transmitted RS, e.g., a-CSI-RS. Each entry in the list is further associated with an index of the corresponding reference signal, e.g., time index in the case of SSB, or CSI-RS resource indicator (CRI) in the case of p/a-CSI-RS. The terminology RSI (Reference Signal Index) is adopted to refer to the index generically.

In general the mapping between QRI state and RSI is signaled to the UE in either a (1) explicit manner, e.g., through RRC or MAC-CE signaling or (2) implicit manner.

For explicit manner (1) the UE performs measurements typically on a large number of periodic RS resources (SSB or p-CSI-RS), i.e., large number of Tx beams, and provides RSRP feedback (including corresponding RSI) to the eNB on a set of preferred resources (beams). The gNB then selects a subset of the measured/reported RSIs and associates them to the QRI states in the list. This mapping is then signaled to the UE on a relatively slow basis based on RRC or MAC-CE signaling.

For implicit manner (2) is used in the case when the UE performs measurements on a set of aperiodic RS resources (a-CSI-RS). Again, the UE may provide RSRP feedback (including RSI) to the eNB on the preferred resource (beam). However, unlike for explicit manner (1), the mapping between QRI state and RSI is not explicitly signaled to the UE subsequent to the measurement. Rather, the QRI (e.g. 2 bits) is included in the message triggering the measurement on the set of aperiodic RS resource in the first place. In this sense, the association between QRI and RSI is implicitly determined based on the measurement trigger and the preferred resource (RSI) based on the most recent measurement on the set of aperiodically transmitted RS.

Implicit manner (2) may also be used in the case of an initial access procedure in which case the UE assumes, for example, that QRI=0 which is reserved for the beam pair link determined based on the RACH procedure. The mapping of QRI=0 to RSI is obtained implicitly based on the time index of the preferred SSB selected by the UE (encoded in the PBCH).

Example of Beam Indication

For exemplary purposes, an example of how seven different QRI states have been configured is shown in Table 1 (below). The example corresponds to an establishment of up to 7 different beam pair links based on 3 different RS types, SSB (periodic), p-CSI-RS, and a-CSI-RS. Hence, the network can transmit beams in 7 different ways (different beamforming weights or even from different transmission points) using 7 different RSs and the UE stores the receiver configuration (i.e. analog RX beam) for each of these RSs. These 7 different QRIs can be indicated with 3 bits.

Table 1 also includes a column to indicate how the association between the QRI and a reference signal index (RSI) is made known to the UE, either implicitly or explicitly. In both cases, the RSIs are determined based on prior measurements of a set of reference signals and the RSI typically corresponds to the preferred resource index, e.g., the one with the largest RSRP. Based on this determination, the UE can augment each row with an RSI as shown in Table 2 (below).

TABLE 1

QRI table RRC configured to UE

| QRI | RS type | RSI to QRI association type |
|---|---|---|
| 0 | SSB | Implicit |
| 1 | SSB | Explicit |
| 2 | SSB | Explicit |
| 3 | p-CSI-RS | Explicit |
| 4 | p-CSI-RS | Explicit |
| 5 | a-CSI-RS | Implicit |
| 6 | a-CSI-RS | Implicit |

TABLE 2

QRI table maintained at UE including implicitly determined and explicitly signaled reference symbol indices (RSI)

| QRI | RS type | RSI to QRI association type | RSI |
|---|---|---|---|
| 0 | SSB | Implicit | Time index = 4 |
| 1 | SSB | Explicit | Time index = 8 |
| 2 | SSB | Explicit | Time index = 45 |
| 3 | p-CSI-RS | Explicit | CRI = 21 |
| 4 | p-CSI-RS | Explicit | CRI = 56 |
| 5 | a-CSI-RS | Implicit | CRI = 3 |
| 6 | a-CSI-RS | Implicit | CRI = 7 |

Beam Specific UL Power Control

Setting output power levels of transmitters, base stations in downlink and mobile stations in uplink, in mobile systems is commonly referred to as power control (PC). Objectives of PC include improved capacity, coverage, improved system robustness, and reduced power consumption. In LTE PC mechanisms can be categorized in to the groups (i) open-loop, (ii) closed-loop, and (iii) combined open- and closed loop. These differ in what input is used to determine the transmit power. In the open-loop case, the transmitter measures some signal sent from the receiver, and sets its output power based on this. In the closed-loop case, the receiver measures the signal from the transmitter, and based on this sends a Transmit Power Control (TPC) command to the transmitter, which then sets its transmit power accordingly. In a combined open- and closed-loop scheme, both inputs are used to set the transmit power.

In, for instance LTE release 10, the UE is initially performing PC for PRACH using $$P_{PRACH} = \min\{P_{CMAX,c}(i), \text{PREAMBLE\_RECEIVED\_TARGET\_POWER} + PL_c\}.$$

After a connection is established between the UE and the eNodeB the UE can be configured for performing UL PC also on PUCCH, PUSCH and SRS transmission. Setting the UE transmit power for a physical uplink control channel (PUCCH) transmission is done from $$P_{PUCCH} = \min\{P_{CMAX,c}, P_{0,PUCCH} + PL_c + \nabla_{Format} + \delta\}$$

Here $P_{PUCCH}$ is the transmit power to use in a given subframe and $PL_c$ is the pathloss estimated by the UE. For PUSCH one instead use the equation $$P_{PUSCH,c} = \min\{P_{CMAX,c}, P_{PUCCH}, P_{0,PUSCH} + \alpha PL_c + 10 \log_{10} M + \nabla_{MCS} + \delta\}$$

where c denotes the serving cell and $P_{PUSCH,c}$ is the transmit power to use in a given subframe. For SRS one defines $$P_{SRS,c} = \min\{P_{CMAX,c} - P_{PUCCH}, P_{SRS_{OFFSET},c} + 10 \log_{10} M_{SRS,c} + P_{0,PUSCH,c} + \alpha PL_c + \delta\}.$$

It is noted that $PL_c$ is a part of setting the power level for the UE transmission. It is clear from this that the pathloss estimation conducted by the UE plays an important role of the PC. The pathloss must in turn be estimated from a DL transmission and is typically done by measuring on a reference signal.

It is agreed that NR supports beam specific power control although the exact details on what beam specific implies are not yet fully decided. Beam specific PC may for instance be a scheme that enables use cases where separate power control in multiple UE TX and gNB RX beam pairs are maintained. For example, use cases include: (i) a UE transmitting to a TRP using a certain beam switches to another beam and then consequently also switches from one PC loop to another and (ii) a UE transmitting to a TRPs switches to another TRP and then consequently also switches from one PC loop to another.

There currently exist certain challenge(s).

SUMMARY

For the purpose of UL PC it has been agreed that NR will base its path loss estimation based on SS Blocks (SSB), and periodic CSI-RS (p-CSI-RS). It is furthermore also being discussed to also allow aperiodic (a-CSI-RS) and semi-persistent CSI-RS (s-CSI-RS) to be used for UL power control. Hence, since multiple different reference signals will be used for UL PC there is a need to solve the issue on how to make the UE aware on which reference signals to measure on and also when to use which reference signal when conducting beam specific UL PC.

Certain aspects of the present disclosure and their embodiments may provide solutions to the above noted challenges or other challenges. The purpose of QRI in prior art has been to connect to a DL reference signal and a DL transmission. According to some embodiments, this is extended such that: (i) each QRI is also connected to a UL power control loop, and (ii) within this PC loop the path loss estimation may be based on the reference signal corresponding to the QRI.

This will in turn imply that if a UE would like to perform PUSCH (or PUCCH) transmission such that the UE Tx beam direction is the same as for the PDSCH (or PDCCH) UE Rx beam direction a suitable PC strategy would be to use the PC loop corresponding to the indicated QRI for PUSCH (or PUCCH). Hence, which PC loop that should be used may hence be implicitly obtained from a downlink control message (DCI or MAC-CE) where QRI for PDSCH and/or PDCCH is signaled. Alternatively the QRI is explicitly signaled in order to select PUSCH and/or PUCCH QRI and the PC loops follows this indexing.

1. The UE is indicated a QRI in a downlink control channel scheduling message (e.g. DCI) or a MAC control message (e.g., MAC-CE) from a list of QRIs and the UE uses the QRI as a reference for choosing one out of multiple UL PC loops.
2. Each entry in the list of QRIs is connected to a PC loop which may or may not use the RS corresponding to the QRI to estimate path loss for PC purposes.
3. The UE configures the UL PC loops via RRC signaling with a part common for all PC loops and one part specific for each PC loop where the said specific part may be specified as an offset to the common part.
   a. In case the specific part is not yet configured the UE may set it to zero and thus only use the common part.
4. The indicated QRI is attached to report and/or trigger a power headroom report for a certain UL PC loop.
5. SRS PC is connected to the QRI currently, or last used, for PDSCH transmission.
6. SRS PC is connected to a RS without indicating a QRI.

There are, proposed herein, various embodiments which address one or more of the issues disclosed herein.

For example, in one aspect there is provided a method implemented in a user equipment, UE. The method includes receiving a downlink, DL, information, determining a spatial association for an uplink, UL, transmission based on the DL information, and determining a spatial association for an uplink, UL, transmission based on the DL information.

In some embodiments, determining the spatial association comprises determining one of a) a spatial filter b) a precoder c) a beam used for the UL transmission.

In some embodiments, determining the spatial association further comprises determining a spatial association with a first reference signal, RS, configuration, based on the DL information.

In some embodiments, the first RS configuration is an uplink (UL) Sounding Reference Signal (SRS) configuration.

In some embodiments, the first RS configuration is a downlink (DL) RS configuration.

In some embodiments, the DL RS configuration includes one of a) a CSI-RS index or b) a SSB index.

In some embodiments, determining PC parameters comprises determining an offset value (P0) for UL power control.

In some embodiments, determining PC parameters comprises determining a RS used for path loss estimation.

In some embodiments, the DL information is a bitfield in Downlink Control Information, DCI, received using a Physical Downlink Control Channel, PDCCH.

In some embodiments, the DL information is a bitfield in a MAC CE.

In some embodiments, the bitfield is Sounding Reference Signal Indicator, SRI, in DCI received using the PDCCH.

In some embodiments, the method includes obtaining the transmit power for a PUSCH transmission based on the UL PC parameters.

In some embodiments, the method includes obtaining the transmit power for a PUCCH transmission based on the UL PC parameters.

In some embodiments, determining PC parameters comprises determining an alpha value and/or a loop index value, wherein, optionally, the alpha value and/or the loop index value are beam specific.

In some embodiments, the DL information comprises a Sounding Reference Signal (SRS) indicator, SRI, representing a SRI state selected from a set of available SRI states.

In some embodiments, each of the available SRI states is associated with one or more DL RSs.

In some embodiments, wherein determining the PC parameters comprises determining the UL PC parameters associated with the SRI.

In another aspect there is provided a UE being configured to receive a downlink, DL, information, determine a spatial association for an uplink, UL, transmission based on the DL information, and determine UL power control, PC, parameters based on the DL information.

In some embodiments, determining the spatial association comprises determining one of a) a spatial filter b) a precoder c) a beam used for the UL transmission.

In some embodiments, determining the spatial association further comprises determining a spatial association with a first reference signal, RS, configuration, based on the DL information.

In some embodiments, the first RS configuration is an uplink (UL) Sounding Reference Signal (SRS) configuration.

In some embodiments, the first RS configuration is a downlink (DL) RS configuration.

In some embodiments, the DL RS configuration includes one of a) a CSI-RS index or b) a SSB index.

In some embodiments, determining PC parameters comprises determining an offset value (P0) for UL power control.

In some embodiments, determining PC parameters comprises determining a RS used for path loss estimation.

In some embodiments, the DL information is a bitfield in Downlink Control Information, DCI, received using a Physical Downlink Control Channel, PDCCH.

In some embodiments, the DL information is a bitfield in a MAC CE.

In some embodiments, the bitfield is Sounding Reference Signal Indicator, SRI, in DCI received using the PDCCH.

In some embodiments, the UE is further configured to obtain the transmit power for a PUSCH transmission based on the UL PC parameters.

In some embodiments, the UE is further configured to obtain the transmit power for a PUCCH transmission based on the UL PC parameters.

In some embodiments, determining PC parameters comprises determining an alpha value and/or a loop index value, wherein, optionally, the alpha value and/or the loop index value are beam specific.

In some embodiments, the DL information comprises a Sounding Reference Signal (SRS) indicator, SRI, representing a SRI state selected from a set of available SRI states.

In some embodiments, each of the available SRI states is associated with one or more DL RSs.

In some embodiments, determining the PC parameters comprises determining the UL PC parameters associated with the SRI.

Apparatus, computer programs and computer media suitable to implement methods as noted above or carry instructions for such methods, are also provided.

The embodiments provide none, one or more of the following technical advantage(s). For example, since the PC loop choice will follow the indicated QRI for PDSCH/PDCCH or PUSCH/PUCCH there will be no need for additional signaling, the PC loop follows as a consequence when indicating QRI in a downlink control message. This is important since the amount of data that can be carried in the downlink control message is very limited.

Furthermore, the reference signals utilized for beam management can also be utilized for UL PC. This will enable a "lean" setup since no additional reference signals need to be configured for UL PC than one ones used for beam management purposes.

BRIEF DESCRIPTION OF THE DRAWINGS

The accompanying drawings, which are incorporated herein and form part of the specification, illustrate various embodiments.

FIG. 17 illustrates a table showing a set of TCI states according to some embodiments.

DETAILED DESCRIPTION

Figure 1:
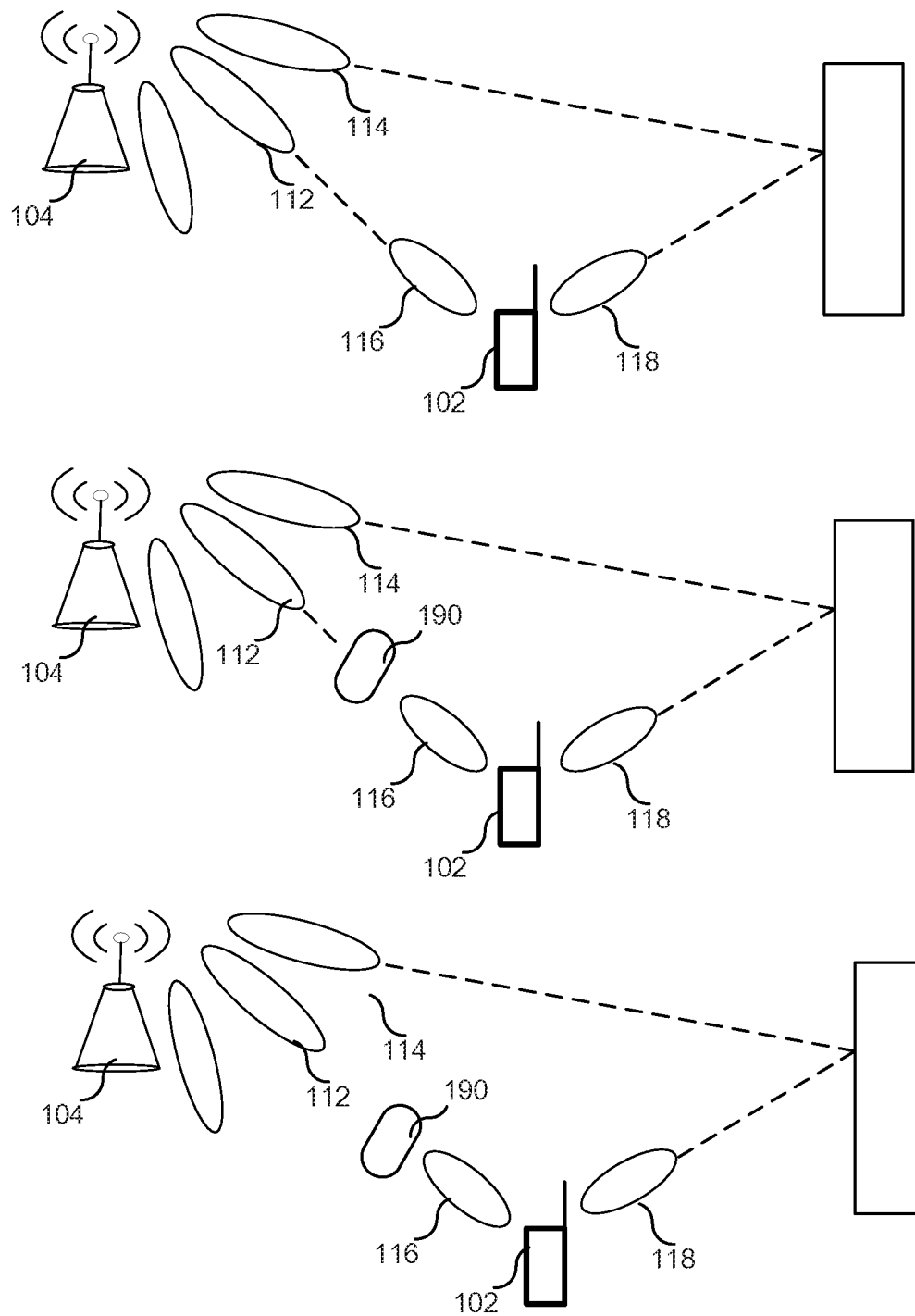
FIG. 1 illustrates the use of active and monitored beam links for communications between a TRP and a UE according to some embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Beam Specific UL PC

One embodiment of the present disclosure is presented in the tables below where PC for PUSCH is considered.

TABLE 3

QRI table RRC configured to UE

| QRI | RS type | RSI to QRI association type | PC loop |
| --- | --- | --- | --- |
| 0 | SSB | Implicit | $P_{PUSCH, c}^{0}$ |
| 1 | SSB | Explicit | $P_{PUSCH, c}^{1}$ |
| 2 | SSB | Explicit | $P_{PUSCH, c}^{2}$ |
| 3 | p-CSI-RS | Explicit | $P_{PUSCH, c}^{3}$ |
| 4 | p-CSI-RS | Explicit | $P_{PUSCH, c}^{4}$ |
| 5 | a-CSI-RS | Implicit | $P_{PUSCH, c}^{5}$ |
| 6 | a-CSI-RS | Implicit | $P_{PUSCH, c}^{6}$ |

TABLE 4

QRI table maintained at UE including implicitly determined and explicitly signaled reference symbol indices (RSI)

| QRI | RS type | RSI to QRI association type | RSI | PC loop |
| --- | --- | --- | --- | --- |
| 0 | SSB | Implicit | Time index = 4 | $P_{PUSCH, c}^{0}$ |
| 1 | SSB | Explicit | Time index = 8 | $P_{PUSCH, c}^{1}$ |
| 2 | SSB | Explicit | Time index = 45 | $P_{PUSCH, c}^{2}$ |
| 3 | p-CSI-RS | Explicit | CRI = 21 | $P_{PUSCH, c}^{3}$ |
| 4 | p-CSI-RS | Explicit | CRI = 56 | $P_{PUSCH, c}^{4}$ |
| 5 | a-CSI-RS | Implicit | CRI = 3 | $P_{PUSCH, c}^{5}$ |
| 6 | a-CSI-RS | Implicit | CRI = 7 | $P_{PUSCH, c}^{6}$ |

As can be seen from these tables there has been a PC loop attached to each QRI where the UL PC loop $P_{PUSCH,c}^{i}$ is given by $$P_{PUSCH,c}^{i} = \min\{P_{CMAX,c}^{i} - P_{PUCCH,c}^{J}, P_{0,PUSCH}^{i} + \alpha_i PL_c^{i} + 10 \log_{10} M_i + V_{MCS}^{i} + \delta_i\}.$$

Here the meaning of $\alpha_i$, $P_{0,PUSCH}^{i}$ etc. is that these parameters may be configured in a beam specific manner and may thus depend on i. They may however also be shared such that for instance $\alpha_0 = \alpha_1 = \ldots = \alpha_6 = \alpha$ meaning that only α needs to be configured. The index J in $P_{PUCCH}^{J}$ refers to the beam used for PUCCH transmission.

Furthermore, $PL_c^{i}$ implies that the path loss estimation is based on the reference signal corresponding to QRI i. Hence, each time the reference signal corresponding to QRI i is transmitted it may be used by the UE in order to estimate $PL_c^{i}$ which is typically done by performing a long term averaging.

In one embodiment $$PL_c^{i} = \text{referenceSignalPower}\_i - \text{higher\_layer\_filtered\_RSRP}\_i$$

where referenceSignalPower_i is defined by the network. Hence, in the above example transmitting the a-CSI-RS corresponding to CRI=3 (QRI=5) would enable the UE to obtain more information about $PL_c^{5}$ and $P_{PUSCH,c}^{5}$ may be updated accordingly.

When a measurement restriction is configured for the reference signal corresponding to QRI i, the UE should not perform a long-term average for path loss computation. On alternative for this case is for the UE to use a different reference signal for PL estimation (e.g. as discussed in 5.2) on which long term averaging is possible.

Finally it is pointed out that for a beam currently not used for PUSCH, hence M=0, the equation may instead be defined as $P_{PUSCH,c}^{i} = \min\{P_{CMAX,c}^{i} - P_{PUCCH}^{J}, P_{0,PUSCH} + \alpha_i PL_c^{i} + \delta_i\}$.

Implicit Vs. Explicit

The configuration of the UL PC parameters, like for instance $\alpha_i$, $P_{0,PUSCH}^{i}$, may be done using RRC configuration. As stated earlier the mapping between QRI state and RSI may be done in different ways. For explicit mapping RRC or MAC-CE signaling are natural candidates whereas for implicit mapping DCI is used. Hence, letting for instance an a-CSI-RS be configured via implicit mapping, which in turn defines a UL PC loop, leads to that there may exist a time interval where the UL PC loop is defined, in terms of which RS to measure on, but the parameters like $\alpha_i$, $P_{0,PUSCH}{}^i$ etc. are not yet available at the UE since RRC configuration is typically slower than DCI signaling. In one embodiment this is solved by defining beam specific parameters according to the format $\alpha_i = \alpha + \Delta\alpha_i$ where $\alpha$ is a default value, shared for all PC loops, and $\Delta\alpha_i$ is an offset applied only to beam i. This offset can then be assumed to equal 0 until another value has been configured via RRC. Hence, $\alpha$ will in this case correspond to a default behavior. A similar strategy can be applied to $P_{0,PUSCH}{}^i$ by writing $P_{0,PUSCH}{}^i = P_{0,PUSCH} + \Delta P_{0,PUSCH}{}^i$ where then $P_{0,PUSCH}$ represents the default value.

Beam Specific UL PC with Shared PL Estimation Processes

In one embodiment of the present disclosure, the PC loop is connected to QRI but the reference signal used for path loss estimation is not necessarily the same as the one connected to the QRI. This is illustrated by the example below where the PC loops corresponding to QRI=5 and QRI=6 no longer are based on the reference signals defining the QRI itself.

TABLE 5

QRI table maintained at UE including implicitly determined and explicitly signaled reference symbol indices (RSI)

| QRI | RS type | RSI to QRI association type | RSI | PC loop | RS for PC PL estimation |
|---|---|---|---|---|---|
| 0 | SSB | Implicit | Time index = 4 | $P_{PUSCH, c}{}^0$ | SSB |
| 1 | SSB | Explicit | Time index = 8 | $P_{PUSCH, c}{}^1$ | SSB |
| 2 | SSB | Explicit | Time index = 45 | $P_{PUSCH, c}{}^2$ | SSB |
| 3 | p-CSI-RS | Explicit | CRI = 21 | $P_{PUSCH, c}{}^3$ | p-CSI-RS, CRI = 21 |
| 4 | p-CSI-RS | Explicit | CRI = 56 | $P_{PUSCH, c}{}^4$ | p-CSI-RS, CRI = 56 |
| 5 | a-CSI-RS | Implicit | CRI = 3 | $P_{PUSCH, c}{}^5$ | p-CSI-RS, CRI = 21 |
| 6 | a-CSI-RS | Implicit | CRI = 7 | $P_{PUSCH, c}{}^6$ | p-CSI-RS, CRI = 56 |

Beam Specific UL PC with PC Processes Pool

In one embodiment of the present disclosure, the PC loop is connected to the QRI but the PC loop points to one of a multiple PC loop processes in a pool of PC processes. This is exemplified below where each QRI is connected to one out of three PC loop processes.

TABLE 6

QRI table maintained at UE including implicitly determined and explicitly signaled reference symbol indices (RSI)

| QRI | RS type | RSI to QRI association type | RSI | PC loop |
|---|---|---|---|---|
| 0 | SSB | Implicit | Time index = 4 | $P_{PUSCH, c}{}^0$ |
| 1 | SSB | Explicit | Time index = 8 | $P_{PUSCH, c}{}^0$ |
| 2 | SSB | Explicit | Time index = 45 | $P_{PUSCH, c}{}^0$ |
| 3 | p-CSI-RS | Explicit | CRI = 21 | $P_{PUSCH, c}{}^1$ |

TABLE 6-continued

QRI table maintained at UE including implicitly determined and explicitly signaled reference symbol indices (RSI)

| QRI | RS type | RSI to QRI association type | RSI | PC loop |
|---|---|---|---|---|
| 4 | p-CSI-RS | Explicit | CRI = 56 | $P_{PUSCH, c}{}^2$ |
| 5 | a-CSI-RS | Implicit | CRI = 3 | $P_{PUSCH, c}{}^1$ |
| 6 | a-CSI-RS | Implicit | CRI = 7 | $P_{PUSCH, c}{}^2$ |

The PC loop processes, available in the PC processes pool, are in turn defined in another table as illustrated below.

TABLE 7

Pool of PC processes

| PC loop | RS for PC PL estimation |
|---|---|
| $P_{PUSCH, c}{}^0$ | SSB, Time index = 4 |
| $P_{PUSCH, c}{}^1$ | p-CSI-RS, CRI = 21 |
| $P_{PUSCH, c}{}^2$ | p-CSI-RS, CRI = 56 |

UL PC Loop Indication

In one embodiment, the UE would like to perform PUSCH or PUCCH transmission such that the UE Tx beam direction is the same as for the PDSCH or PDCCH UE Rx beam direction. This will in turn imply that a suitable PC strategy would be to use the PC loop corresponding to the QRI of the corresponding PDSCH or PDCCH beams. Hence, which PC loop that should be used may hence be implicitly obtained from a downlink control message (DCI or MAC-CE) where QRI for PDSCH and/or PDCCH is signaled. Alternatively the QRI is explicitly signaled in order to select PUSCH and/or PUCCH beams and the PC loops follows this indexing. The QRI is thus possible to use also for UL PC purposes and it will not be needed separate signaling for deciding on UL PC loop since it needs to be present in order to decide on a PUSCH or PUCCH beam.

In one example, UE receives an UL grant via PDCCH. In response to the UL grant, the UE makes a PUSCH transmission. The UL grant can include a M bit field (e.g. QRI indicator, and e.g. M=2 or 3 bits). Based on the M bit field, the UE determines a DL RS configuration (e.g. a RS type such a CSI-RS or SSB and a RS index such a CSI-RS resource index, or time index associated with SSB). The UE also determines a spatial quasi-colocation association based on the DL RS configuration. The UE can determine a spatial filter/spatial precoder/beam used for making the PUSCH transmission using the spatial quasi-colocation association. For example, if the UE uses a first DL spatial filter/spatial precoder/beam for receiving a DL RS with the determined DL RS configuration, it uses an UL spatial filter/spatial precoder/beam that is reciprocal to the first DL spatial filter/spatial precoder/beam to make its PUSCH transmission. The UE determines the transmit power of the PUSCH transmission using power control (PC) parameters which can include a RS type used for path loss (PL) estimation and an offset value (e.g. P0_PUSCH). The PC parameters that the UE uses can be determined from the same M bit field included in the grant. Alternately, the PC parameters can be determined using a separate L bit field (e.g. L=1 or 2 bits) included in the same grant. Alternately, the PC parameters can be determined using a L bit field (e.g. L=1 or 2 bits) and the M bit field included in the same grant.

In another example, UE receives an UL grant via PDCCH. In response to the UL grant, the UE makes a PUSCH transmission. Prior to receiving the PDCCH, the UE receives a MAC-CE or other indication that includes an M bit field (e.g. QRI indicator, and e.g. M=2 or 3 bits) and the M bit field provides spatial QCL information for receiving the PDCCH. Based on the M bit field, the UE determines a DL RS configuration (e.g. a RS type such a CSI-RS or SSB and a RS index such a CSI-RS resource index, or time index associated with SSB). The UE also determines a spatial quasi-colocation association based on the DL RS configuration. The can UE determine a spatial filter/spatial precoder/beam used for making the PUSCH transmission using the spatial quasi-colocation association. For example, if the UE uses a first DL spatial filter/spatial precoder/beam for receiving the DL RS with the determined DL RS configuration, it uses an UL spatial filter/spatial precoder/beam that is reciprocal to the first DL spatial filter/spatial precoder/beam to make its PUSCH transmission. Similar to earlier example, the UE determines the transmit power of the PUSCH transmission using power control (PC) parameters which can include a RS type used for path loss (PL) estimation and an offset value (e.g. P0_PUSCH). The PC parameters that the UE uses can be determined from the same M bit field included in the grant. Alternately, the PC parameters can be determined using a separate L bit field (e.g. L=1 or 2 bits) included in the same grant. Alternately, the PC parameters can be determined using a L bit field (e.g. L=1 or 2 bits) and the M bit field included in the same grant.

In another embodiment, UE receives an UL grant via PDCCH. In response to the UL grant, the UE makes a PUSCH transmission. The UL grant can include a M bit field (e.g. SRS resource indicator (SRI), and e.g. M=2 or 3 bits). Based on the M bit field, the UE determines an UL RS configuration (e.g. a SRS configuration). The UE also determines a spatial quasi-colocation association based on the UL RS configuration. The UE can determine a spatial filter/spatial precoder/beam used for making the PUSCH transmission using the spatial quasi-colocation association. For example, if the UE uses a first UL spatial filter/spatial precoder/beam for transmitting an SRS with the determined UL RS configuration, it uses the same spatial filter/spatial precoder/beam to make its PUSCH transmission. The UE determines the transmit power of the PUSCH transmission using power control (PC) parameters which can include a RS type used for path loss (PL) estimation and an offset value (e.g. P0_PUSCH). The PC parameters that the UE uses can be determined from the same M bit field included in the grant. Alternately, the PC parameters can be determined using a separate L bit field (e.g. L=1 or 2 bits) included in the same grant. Alternately, the PC parameters can be determined using a L bit field (e.g. L=1 or 2 bits) and the M bit field included in the same grant.

PHR

In one embodiment beam specific power headroom reports (PHR) may be triggered in a beam specific manner and the beam index (e.g. a QRI index) of the requested PHR is signalled from the gNB to the UE. This index is tied to the given PC loop and hence also the corresponding QRI. Thus, QRI may be used also here in order to indicate which beam to derive a PHR for.

PUCCH

Although previous section described UL PC for PUSCH the presented embodiments are easy to extend, for someone skilled in the art, to also apply to PUCCH.

In one example, UE receives DL assignment to receive a PDSCH transmission. In response to receiving the PDSCH, the UE makes a PUCCH transmission containing HARQ feedback corresponding to the PDSCH. The DL assignment can include a M bit field (e.g. QRI indicator, and e.g. M=2 or 3 bits). Based on the M bit field, the UE determines a DL RS configuration (e.g. a RS type such a CSI-RS or SSB and a RS index such a CSI-RS resource index, or time index associated with SSB). The UE also determines a spatial quasi-colocation association based on the DL RS configuration. The UE can determine a spatial filter/spatial precoder/beam used for making the PUCCH transmission using the spatial quasi-colocation association. For example, if the UE uses a first DL spatial filter/spatial precoder/beam for receiving the DL RS with the determined DL RS configuration, it uses an UL spatial filter/spatial precoder/beam that is reciprocal to the first DL spatial filter/spatial precoder/beam to make its PUCCH transmission. The UE determines the transmit power of the PUCCH transmission using power control (PC) parameters which can include a RS type used for path loss (PL) estimation and an offset value (e.g. P0_PUCCH). The PC parameters that the UE uses can be determined from the same M bit field included in the grant. Alternately, the PC parameters can be determined using a separate L bit field (e.g. L=1 or 2 bits) included in the same grant. Alternately, the PC parameters can be determined using a L bit field (e.g. L=1 or 2 bits) and the M bit field included in the same grant.

Non Beam Specific SRS PC Based on Multiple Reference Signals

In one embodiment SRS PC is based on the beam, hence QRI, currently (or last used) for PUSCH transmission. If QRI is denoted I the SRS UL PC may be written $$P_{SRS,c} = \min\{P_{CMAX,c}^I - P_{PUCCH}^J, P_{SRS_{OFFSET},c} + 10 \log_{10} M_{SRS,c} + P_{0,PUSCH,c}^I + \alpha_I PL_c^I + \delta_I\}$$

meaning that the SRS PC will adopt to the propagation environment corresponding to the current PUSCH transmission. In one embodiment the SRS is transmitted such that the UE Tx beam direction is the same as for the corresponding PDSCH UE Rx beam direction for beam I. In another embodiment multiple SRS:s are transmitted in different UE Tx beam directions close the direction of the PDSCH UE Rx beam direction for beam I. In yet another embodiment a SRS beam sweep is carried out by transmitting SRS:s using many different UE Tx beams and directions where some of the directions differ substantially from the PDSCH UE Rx beam direction for beam I.

Non Beam Specific SRS PC Based on a Single Reference Signal

In one embodiment SRS PC is based on a certain reference signal, for instance the SSB, despite that PUSCH and/or PUCCH uses multiple reference signals as exemplified in previous embodiments. In this case the PC may be given as $$P_{SRS,c} = \min\{P_{CMAX,c} - P_{PUCCH}^J, P_{SRS_{OFFSET},c} + 10 \log_{10} M_{SRS,c} + P_{0,PUSCH,c} + \alpha PL_c + \delta\}$$

where it is assumed that $P_{0,PUSCH,c}$, $\alpha$ etc. are a set of default values for beam specific PUSCH PC or alternatively a set of parameters used for SRS PC. $PL_c$ is in this embodiment estimated based on the SRS reference signal, for instance SSB.

Beam Specific SRS PC

In yet another embodiment multiple SRS transmissions SRS_0, SRS_1, ..., SRS_6 are carried out where SRS_i is transmitted using a UE Tx beam direction the is the same as for the corresponding PUSCH UE Tx beam direction for beam i. Applying a beam specific power control on SRS by basing the SRS PC on the corresponding PUSCH beam may then be written $$P_{SRS,c} = \min\{P_{CMAX,c}^i - P_{PUCCH,c}^j, P_{SRS_{OFFSET},c}^i + 10 \log_{10} M_{SRS,c} + P_{0,PUSCH,c}^i \alpha_c PL_c^i + \delta_i\}$$

meaning that the SRS PC will adopt to the propagation environment corresponding to the corresponding PUSCH beam.

Figure 2:
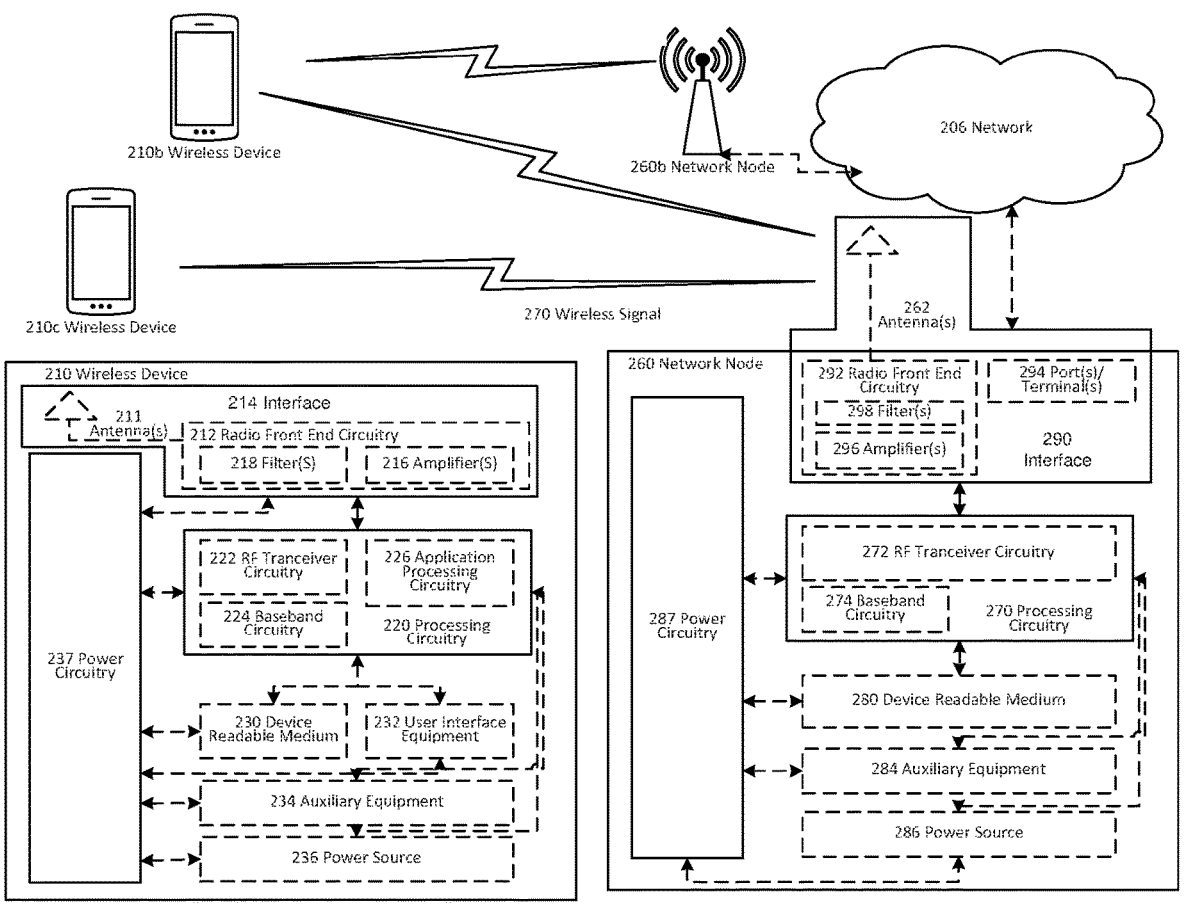
FIG. 2, which shows a wireless network in accordance with some embodiments.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 206, network nodes 260 and 260b, and WDs 210, 210b, and 210c. In practice, a wireless network may further include any additional elements suitable to support communication between wireless devices or between a wireless device and another communication device, such as a landline telephone, a service provider, or any other network node or end device. Of the illustrated components, network node 260 and wireless device (WD) 210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 260 and WD 210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 260 includes processing circuitry 270, device readable medium 280, interface 290, auxiliary equipment 284, power source 286, power circuitry 287, and antenna 262. Although network node 260 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 260 are depicted as single boxes located within a larger box, or nested within multiple boxes, in practice, a network node may comprise multiple different physical components that make up a single illustrated component (e.g., device readable medium 280 may comprise multiple separate hard drives as well as multiple RAM modules).

Similarly, network node 260 may be composed of multiple physically separate components (e.g., a NodeB component and a RNC component, or a BTS component and a BSC component, etc.), which may each have their own respective components. In certain scenarios in which network node 260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 260 may be configured to support multiple radio access technologies (RATs). In such embodiments, some components may be duplicated (e.g., separate device readable medium 280 for the different RATs) and some components may be reused (e.g., the same antenna 262 may be shared by the RATs). Network node 260 may also include multiple sets of the various illustrated components for different wireless technologies integrated into network node 260, such as, for example, GSM, WCDMA, LTE, NR, WiFi, or Bluetooth wireless technologies. These wireless technologies may be integrated into the same or different chip or set of chips and other components within network node 260.

Processing circuitry 270 is configured to perform any determining, calculating, or similar operations (e.g., certain obtaining operations) described herein as being provided by a network node. These operations performed by processing circuitry 270 may include processing information obtained by processing circuitry 270 by, for example, converting the obtained information into other information, comparing the obtained information or converted information to information stored in the network node, and/or performing one or more operations based on the obtained information or converted information, and as a result of said processing making a determination.

Processing circuitry 270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 260 components, such as device readable medium 280, network node 260 functionality. For example, processing circuitry 270 may execute instructions stored in device readable medium 280 or in memory within processing circuitry 270. Such functionality may include providing any of the various wireless features, functions, or benefits discussed herein. In some embodiments, processing circuitry 270 may include a system on a chip (SOC).

In some embodiments, processing circuitry 270 may include one or more of radio frequency (RF) transceiver circuitry 272 and baseband processing circuitry 274. In some embodiments, radio frequency (RF) transceiver circuitry 272 and baseband processing circuitry 274 may be on separate chips (or sets of chips), boards, or units, such as radio units and digital units. In alternative embodiments, part or all of RF transceiver circuitry 272 and baseband processing circuitry 274 may be on the same chip or set of chips, boards, or units In certain embodiments, some or all of the functionality described herein as being provided by a network node, base station, eNB or other such network device may be performed by processing circuitry 270 executing instructions stored on device readable medium 280 or memory within processing circuitry 270. In alternative embodiments, some or all of the functionality may be provided by processing circuitry 270 without executing instructions stored on a separate or discrete device readable medium, such as in a hard-wired manner. In any of those embodiments, whether executing instructions stored on a device readable storage medium or not, processing circuitry 270 can be configured to perform the described functionality. The benefits provided by such functionality are not limited to processing circuitry 270 alone or to other components of network node 260, but are enjoyed by network node 260 as a whole, and/or by end users and the wireless network generally.

Device readable medium 280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 270. Device readable medium 280 may store any suitable instructions, data or information, including a computer program, software, an application including one or more of logic, rules, code, tables, etc. and/or other instructions capable of being executed by processing circuitry 270 and, utilized by network node 260. Device readable medium 280 may be used to store any calculations made by processing circuitry 270 and/or any data received via interface 290. In some embodiments, processing circuitry 270 and device readable medium 280 may be considered to be integrated.

Interface 290 is used in the wired or wireless communication of signalling and/or data between network node 260, network 206, and/or WDs 210. As illustrated, interface 290 comprises port(s)/terminal(s) 294 to send and receive data, for example to and from network 206 over a wired connection. Interface 290 also includes radio front end circuitry 292 that may be coupled to, or in certain embodiments a part of, antenna 262. Radio front end circuitry 292 comprises filters 298 and amplifiers 296. Radio front end circuitry 292 may be connected to antenna 262 and processing circuitry 270. Radio front end circuitry may be configured to condition signals communicated between antenna 262 and processing circuitry 270. Radio front end circuitry 292 may receive digital data that is to be sent out to other network nodes or WDs via a wireless connection. Radio front end circuitry 292 may convert the digital data into a radio signal having the appropriate channel and bandwidth parameters using a combination of filters 298 and/or amplifiers 296. The radio signal may then be transmitted via antenna 262. Similarly, when receiving data, antenna 262 may collect radio signals which are then converted into digital data by radio front end circuitry 292. The digital data may be passed to processing circuitry 270. In other embodiments, the interface may comprise different components and/or different combinations of components.

In certain alternative embodiments, network node 260 may not include separate radio front end circuitry 292, instead, processing circuitry 270 may comprise radio front end circuitry and may be connected to antenna 262 without separate radio front end circuitry 292. Similarly, in some embodiments, all or some of RF transceiver circuitry 272 may be considered a part of interface 290. In still other embodiments, interface 290 may include one or more ports or terminals 294, radio front end circuitry 292, and RF transceiver circuitry 272, as part of a radio unit (not shown), and interface 290 may communicate with baseband processing circuitry 274, which is part of a digital unit (not shown).

Antenna 262 may include one or more antennas, or antenna arrays, configured to send and/or receive wireless signals. Antenna 262 may be coupled to radio front end circuitry 290 and may be any type of antenna capable of transmitting and receiving data and/or signals wirelessly. In some embodiments, antenna 262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 262 may be separate from network node 260 and may be connectable to network node 260 through an interface or port.

Antenna 262, interface 290, and/or processing circuitry 270 may be configured to perform any receiving operations and/or certain obtaining operations described herein as being performed by a network node. Any information, data and/or signals may be received from a wireless device, another network node and/or any other network equipment. Similarly, antenna 262, interface 290, and/or processing circuitry 270 may be configured to perform any transmitting operations described herein as being performed by a network node. Any information, data and/or signals may be transmitted to a wireless device, another network node and/or any other network equipment.

Power circuitry 287 may comprise, or be coupled to, power management circuitry and is configured to supply the components of network node 260 with power for performing the functionality described herein. Power circuitry 287 may receive power from power source 286. Power source 286 and/or power circuitry 287 may be configured to provide power to the various components of network node 260 in a form suitable for the respective components (e.g., at a voltage and current level needed for each respective component). Power source 286 may either be included in, or external to, power circuitry 287 and/or network node 260. For example, network node 260 may be connectable to an external power source (e.g., an electricity outlet) via an input circuitry or interface such as an electrical cable, whereby the external power source supplies power to power circuitry 287. As a further example, power source 286 may comprise a source of power in the form of a battery or battery pack which is connected to, or integrated in, power circuitry 287. The battery may provide backup power should the external power source fail. Other types of power sources, such as photovoltaic devices, may also be used.

Alternative embodiments of network node 260 may include additional components beyond those shown in FIG. 2 that may be responsible for providing certain aspects of the network node's functionality, including any of the functionality described herein and/or any functionality necessary to support the subject matter described herein. For example, network node 260 may include user interface equipment to allow input of information into network node 260 and to allow output of information from network node 260. This may allow a user to perform diagnostic, maintenance, repair, and other administrative functions for network node 260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE).

Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 210 includes antenna 211, interface 214, processing circuitry 220, device readable medium 230, user interface equipment 232, auxiliary equipment 234, power source 236 and power circuitry 237. WD 210 may include multiple sets of one or more of the illustrated components for different wireless technologies supported by WD 210, such as, for example, GSM, WCDMA, LTE, NR, WiFi, WiMAX, or Bluetooth wireless technologies, just to mention a few. These wireless technologies may be integrated into the same or different chips or set of chips as other components within WD 210.

Antenna 211 may include one or more antennas or antenna arrays, configured to send and/or receive wireless signals, and is connected to interface 214. In certain alternative embodiments, antenna 211 may be separate from WD 210 and be connectable to WD 210 through an interface or port. Antenna 211, interface 214, and/or processing circuitry 220 may be configured to perform any receiving or transmitting operations described herein as being performed by a WD. Any information, data and/or signals may be received from a network node and/or another WD. In some embodiments, radio front end circuitry and/or antenna 211 may be considered an interface.

As illustrated, interface 214 comprises radio front end circuitry 212 and antenna 211. Radio front end circuitry 212 comprise one or more filters 218 and amplifiers 216. Radio front end circuitry 214 is connected to antenna 211 and processing circuitry 220, and is configured to condition signals communicated between antenna 211 and processing circuitry 220. Radio front end circuitry 212 may be coupled to or a part of antenna 211. In some embodiments, WD 210 may not include separate radio front end circuitry 212; rather, processing circuitry 220 may comprise radio front end circuitry and may be connected to antenna 211. Similarly, in some embodiments, some or all of RF transceiver circuitry 222 may be considered a part of interface 214. Radio front end circuitry 212 may receive digital data that is to be sent out to other network nodes or WDs via a wireless connection. Radio front end circuitry 212 may convert the digital data into a radio signal having the appropriate channel and bandwidth parameters using a combination of filters 218 and/or amplifiers 216. The radio signal may then be transmitted via antenna 211. Similarly, when receiving data, antenna 211 may collect radio signals which are then converted into digital data by radio front end circuitry 212. The digital data may be passed to processing circuitry 220. In other embodiments, the interface may comprise different components and/or different combinations of components.

Processing circuitry 220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 210 components, such as device readable medium 230, WD 210 functionality. Such functionality may include providing any of the various wireless features or benefits discussed herein. For example, processing circuitry 220 may execute instructions stored in device readable medium 230 or in memory within processing circuitry 220 to provide the functionality disclosed herein.

As illustrated, processing circuitry 220 includes one or more of RF transceiver circuitry 222, baseband processing circuitry 224, and application processing circuitry 226. In other embodiments, the processing circuitry may comprise different components and/or different combinations of components. In certain embodiments processing circuitry 220 of WD 210 may comprise a SOC. In some embodiments, RF transceiver circuitry 222, baseband processing circuitry 224, and application processing circuitry 226 may be on separate chips or sets of chips. In alternative embodiments, part or all of baseband processing circuitry 224 and application processing circuitry 226 may be combined into one chip or set of chips, and RF transceiver circuitry 222 may be on a separate chip or set of chips. In still alternative embodiments, part or all of RF transceiver circuitry 222 and baseband processing circuitry 224 may be on the same chip or set of chips, and application processing circuitry 226 may be on a separate chip or set of chips. In yet other alternative embodiments, part or all of RF transceiver circuitry 222, baseband processing circuitry 224, and application processing circuitry 226 may be combined in the same chip or set of chips. In some embodiments, RF transceiver circuitry 222 may be a part of interface 214. RF transceiver circuitry 222 may condition RF signals for processing circuitry 220.

In certain embodiments, some or all of the functionality described herein as being performed by a WD may be provided by processing circuitry 220 executing instructions stored on device readable medium 230, which in certain embodiments may be a computer-readable storage medium. In alternative embodiments, some or all of the functionality may be provided by processing circuitry 220 without executing instructions stored on a separate or discrete device readable storage medium, such as in a hard-wired manner. In any of those particular embodiments, whether executing instructions stored on a device readable storage medium or not, processing circuitry 220 can be configured to perform the described functionality. The benefits provided by such functionality are not limited to processing circuitry 220 alone or to other components of WD 210, but are enjoyed by WD 210 as a whole, and/or by end users and the wireless network generally.

Processing circuitry 220 may be configured to perform any determining, calculating, or similar operations (e.g., certain obtaining operations) described herein as being performed by a WD. These operations, as performed by processing circuitry 220, may include processing information obtained by processing circuitry 220 by, for example, converting the obtained information into other information, comparing the obtained information or converted information to information stored by WD 210, and/or performing one or more operations based on the obtained information or converted information, and as a result of said processing making a determination.

Device readable medium 230 may be operable to store a computer program, software, an application including one or more of logic, rules, code, tables, etc. and/or other instructions capable of being executed by processing circuitry 220. Device readable medium 230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 220. In some embodiments, processing circuitry 220 and device readable medium 230 may be considered to be integrated.

User interface equipment 232 may provide components that allow for a human user to interact with WD 210. Such interaction may be of many forms, such as visual, audial, tactile, etc. User interface equipment 232 may be operable to produce output to the user and to allow the user to provide input to WD 210. The type of interaction may vary depending on the type of user interface equipment 232 installed in WD 210. For example, if WD 210 is a smart phone, the interaction may be via a touch screen; if WD 210 is a smart meter, the interaction may be through a screen that provides usage (e.g., the number of gallons used) or a speaker that provides an audible alert (e.g., if smoke is detected). User interface equipment 232 may include input interfaces, devices and circuits, and output interfaces, devices and circuits. User interface equipment 232 is configured to allow input of information into WD 210, and is connected to processing circuitry 220 to allow processing circuitry 220 to process the input information. User interface equipment 232 may include, for example, a microphone, a proximity or other sensor, keys/buttons, a touch display, one or more cameras, a USB port, or other input circuitry. User interface equipment 232 is also configured to allow output of information from WD 210, and to allow processing circuitry 220 to output information from WD 210. User interface equipment 232 may include, for example, a speaker, a display, vibrating circuitry, a USB port, a headphone interface, or other output circuitry. Using one or more input and output interfaces, devices, and circuits, of user interface equipment 232, WD 210 may communicate with end users and/or the wireless network, and allow them to benefit from the functionality described herein.

Auxiliary equipment 234 is operable to provide more specific functionality which may not be generally performed by WDs. This may comprise specialized sensors for doing measurements for various purposes, interfaces for additional types of communication such as wired communications etc. The inclusion and type of components of auxiliary equipment 234 may vary depending on the embodiment and/or scenario.

Power source 236 may, in some embodiments, be in the form of a battery or battery pack. Other types of power sources, such as an external power source (e.g., an electricity outlet), photovoltaic devices or power cells, may also be used. WD 210 may further comprise power circuitry 237 for delivering power from power source 236 to the various parts of WD 210 which need power from power source 236 to carry out any functionality described or indicated herein. Power circuitry 237 may in certain embodiments comprise power management circuitry. Power circuitry 237 may additionally or alternatively be operable to receive power from an external power source; in which case WD 210 may be connectable to the external power source (such as an electricity outlet) via input circuitry or an interface such as an electrical power cable. Power circuitry 237 may also in certain embodiments be operable to deliver power from an external power source to power source 236. This may be, for example, for the charging of power source 236. Power circuitry 237 may perform any formatting, converting, or other modification to the power from power source 236 to make the power suitable for the respective components of WD 210 to which power is supplied.

Figure 3:
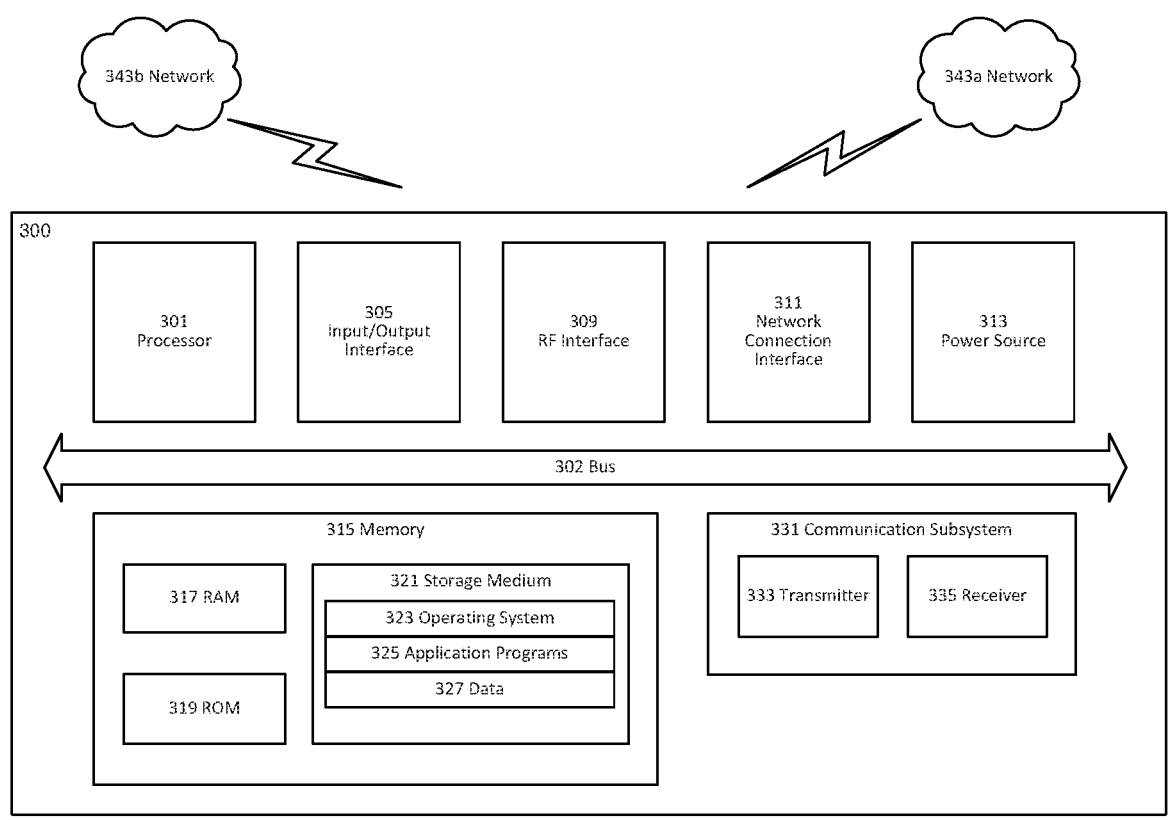
FIG. 3 illustrates one embodiment of a UE in accordance with various aspects.

FIG. 3 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 300 may be any UE identified by the $3^{rd}$ Generation Partnership Project (3GPP), including a NB-IoT UE, a machine type communication (MTC) UE, and/or an enhanced MTC (eMTC) UE. UE 300, as illustrated in FIG. 3, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 3 is a UE, the components discussed herein are equally applicable to a WD, and vice-versa.

In FIG. 3, UE 300 includes processing circuitry 301 that is operatively coupled to input/output interface 305, radio frequency (RF) interface 309, network connection interface 311, memory 315 including random access memory (RAM) 317, read-only memory (ROM) 319, and storage medium 321 or the like, communication subsystem 331, power source 333, and/or any other component, or any combination thereof. Storage medium 321 includes operating system 323, application program 325, and data 327. In other embodiments, storage medium 321 may include other similar types of information. Certain UEs may utilize all of the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, processing circuitry 301 may be configured to process computer instructions and data. Processing circuitry 301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 301 may include two central processing units (CPUs). Data may be information in a form suitable for use by a computer.

In the depicted embodiment, input/output interface 305 may be configured to provide a communication interface to an input device, output device, or input and output device. UE 300 may be configured to use an output device via input/output interface 305. An output device may use the same type of interface port as an input device. For example, a USB port may be used to provide input to and output from UE 300. The output device may be a speaker, a sound card, a video card, a display, a monitor, a printer, an actuator, an emitter, a smartcard, another output device, or any combination thereof. UE 300 may be configured to use an input device via input/output interface 305 to allow a user to capture information into UE 300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, RF interface 309 may be configured to provide a communication interface to RF components such as a transmitter, a receiver, and an antenna. Network connection interface 311 may be configured to provide a communication interface to network 343a. Network 343a may encompass wired and/or wireless networks such as a local-area network (LAN), a wide-area network (WAN), a computer network, a wireless network, a telecommunications network, another like network or any combination thereof. For example, network 343a may comprise a Wi-Fi network. Network connection interface 311 may be configured to include a receiver and a transmitter interface used to communicate with one or more other devices over a communication network according to one or more communication protocols, such as Ethernet, TCP/IP, SONET, ATM, or the like. Network connection interface 311 may implement receiver and transmitter functionality appropriate to the communication network links (e.g., optical, electrical, and the like). The transmitter and receiver functions may share circuit components, software or firmware, or alternatively may be implemented separately.

RAM 317 may be configured to interface via bus 302 to processing circuitry 301 to provide storage or caching of data or computer instructions during the execution of software programs such as the operating system, application programs, and device drivers. ROM 319 may be configured to provide computer instructions or data to processing circuitry 301. For example, ROM 319 may be configured to store invariant low-level system code or data for basic system functions such as basic input and output (I/O), startup, or reception of keystrokes from a keyboard that are stored in a non-volatile memory. Storage medium 321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 321 may be configured to include operating system 323, application program 325 such as a web browser application, a widget or gadget engine or another application, and data file 327. Storage medium 321 may store, for use by UE 300, any of a variety of various operating systems or combinations of operating systems.

Storage medium 321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 321 may allow UE 300 to access computer-executable instructions, application programs or the like, stored on transitory or non-transitory memory media, to off-load data, or to upload data. An article of manufacture, such as one utilizing a communication system may be tangibly embodied in storage medium 321, which may comprise a device readable medium.

In FIG. 3, processing circuitry 301 may be configured to communicate with network 343b using communication subsystem 331. Network 343a and network 343b may be the same network or networks or different network or networks. Communication subsystem 331 may be configured to include one or more transceivers used to communicate with network 343b. For example, communication subsystem 331 may be configured to include one or more transceivers used to communicate with one or more remote transceivers of another device capable of wireless communication such as another WD, UE, or base station of a radio access network (RAN) according to one or more communication protocols, such as IEEE 802.3, CDMA, WCDMA, GSM, LTE, UTRAN, WiMax, or the like. Each transceiver may include transmitter 333 and/or receiver 335 to implement transmitter or receiver functionality, respectively, appropriate to the RAN links (e.g., frequency allocations and the like). Further, transmitter 333 and receiver 335 of each transceiver may share circuit components, software or firmware, or alternatively may be implemented separately.

In the illustrated embodiment, the communication functions of communication subsystem 331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 331 may include cellular communication, Wi-Fi communication, Bluetooth communication, and GPS communication. Network 343b may encompass wired and/or wireless networks such as a local-area network (LAN), a wide-area network (WAN), a computer network, a wireless network, a telecommunications network, another like network or any combination thereof. For example, network 343b may be a cellular network, a Wi-Fi network, and/or a near-field network. Power source 313 may be configured to provide alternating current (AC) or direct current (DC) power to components of UE 300.

The features, benefits and/or functions described herein may be implemented in one of the components of UE 300 or partitioned across multiple components of UE 300. Further, the features, benefits, and/or functions described herein may be implemented in any combination of hardware, software or firmware. In one example, communication subsystem 331 may be configured to include any of the components described herein. Further, processing circuitry 301 may be configured to communicate with any of such components over bus 302. In another example, any of such components may be represented by program instructions stored in memory that when executed by processing circuitry 301 perform the corresponding functions described herein. In another example, the functionality of any of such components may be partitioned between processing circuitry 301 and communication subsystem 331. In another example, the non-computationally intensive functions of any of such components may be implemented in software or firmware and the computationally intensive functions may be implemented in hardware.

Figure 4:
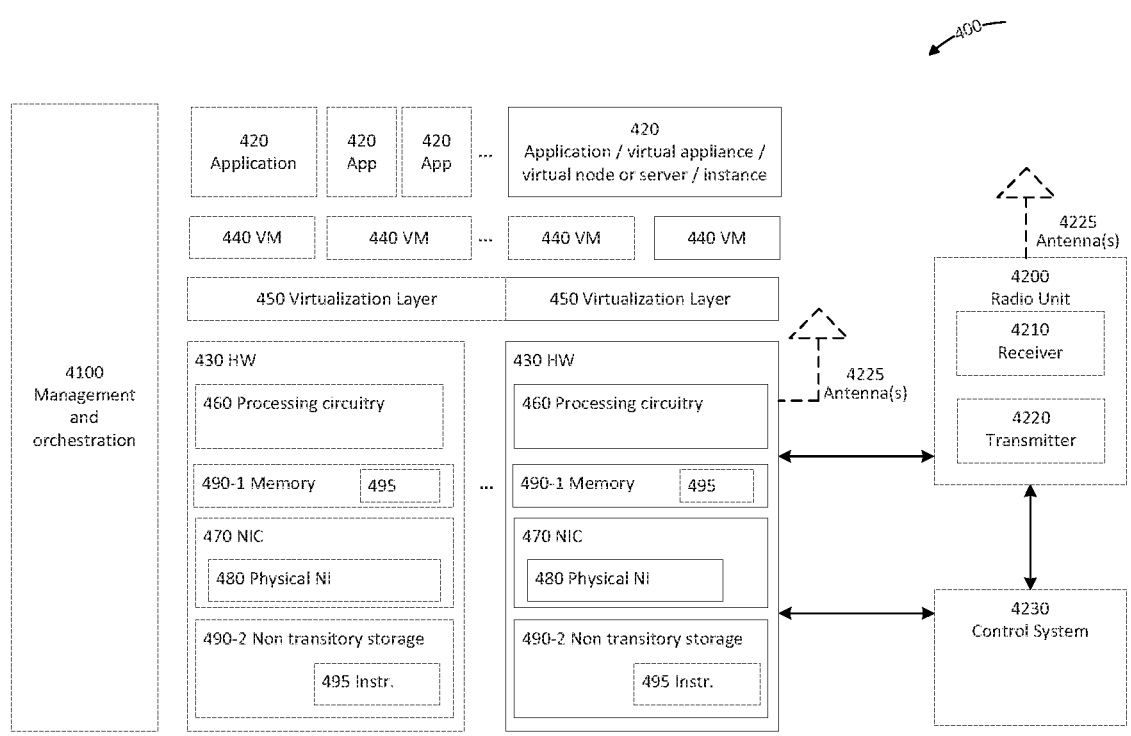
FIG. 4 is a schematic block diagram illustrating a virtualization environment according to some embodiments.

FIG. 4 is a schematic block diagram illustrating a virtualization environment 400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 400 hosted by one or more of hardware nodes 430. Further, in embodiments in which the virtual node is not a radio access node or does not require radio connectivity (e.g., a core network node), then the network node may be entirely virtualized.

The functions may be implemented by one or more applications 420 (which may alternatively be called software instances, virtual appliances, network functions, virtual nodes, virtual network functions, etc.) operative to implement some of the features, functions, and/or benefits of some of the embodiments disclosed herein. Applications 420 are run in virtualization environment 400 which provides hardware 430 comprising processing circuitry 460 and memory 490. Memory 490 contains instructions 495 executable by processing circuitry 460 whereby application 420 is operative to provide one or more of the features, benefits, and/or functions disclosed herein.

Virtualization environment 400, comprises general-purpose or special-purpose network hardware devices 430 comprising a set of one or more processors or processing circuitry 460, which may be commercial off-the-shelf (COTS) processors, dedicated Application Specific Integrated Circuits (ASICs), or any other type of processing circuitry including digital or analog hardware components or special purpose processors. Each hardware device may comprise memory 490-1 which may be non-persistent memory for temporarily storing instructions 495 or software executed by processing circuitry 460. Each hardware device may comprise one or more network interface controllers (NICs) 470, also known as network interface cards, which include physical network interface 480. Each hardware device may also include non-transitory, persistent, machine-readable storage media 490-2 having stored therein software 495 and/or instructions executable by processing circuitry 460. Software 495 may include any type of software including software for instantiating one or more virtualization layers 450 (also referred to as hypervisors), software to execute virtual machines 440 as well as software allowing it to execute functions, features and/or benefits described in relation with some embodiments described herein.

Virtual machines 440, comprise virtual processing, virtual memory, virtual networking or interface and virtual storage, and may be run by a corresponding virtualization layer 450 or hypervisor. Different embodiments of the instance of virtual appliance 420 may be implemented on one or more of virtual machines 440, and the implementations may be made in different ways.

During operation, processing circuitry 460 executes software 495 to instantiate the hypervisor or virtualization layer 450, which may sometimes be referred to as a virtual machine monitor (VMM). Virtualization layer 450 may present a virtual operating platform that appears like networking hardware to virtual machine 440.

As shown in FIG. 4, hardware 430 may be a standalone network node with generic or specific components. Hardware 430 may comprise antenna 4225 and may implement some functions via virtualization. Alternatively, hardware 430 may be part of a larger cluster of hardware (e.g. such as in a data center or customer premise equipment (CPE)) where many hardware nodes work together and are managed via management and orchestration (MANO) 4100, which, among others, oversees lifecycle management of applications 420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 440 may be a software implementation of a physical machine that runs programs as if they were executing on a physical, non-virtualized machine. Each of virtual machines 440, and that part of hardware 430 that executes that virtual machine, be it hardware dedicated to that virtual machine and/or hardware shared by that virtual machine with others of the virtual machines 440, forms a separate virtual network elements (VNE).

Still in the context of NFV, Virtual Network Function (VNF) is responsible for handling specific network functions that run in one or more virtual machines 440 on top of hardware networking infrastructure 430 and corresponds to application 420 in FIG. 4.

In some embodiments, one or more radio units 4200 that each include one or more transmitters 4220 and one or more receivers 4210 may be coupled to one or more antennas 4225. Radio units 4200 may communicate directly with hardware nodes 430 via one or more appropriate network interfaces and may be used in combination with the virtual components to provide a virtual node with radio capabilities, such as a radio access node or a base station.

In some embodiments, some signalling can be effected with the use of control system 4230 which may alternatively be used for communication between the hardware nodes 430 and radio units 4200.

Figure 5:
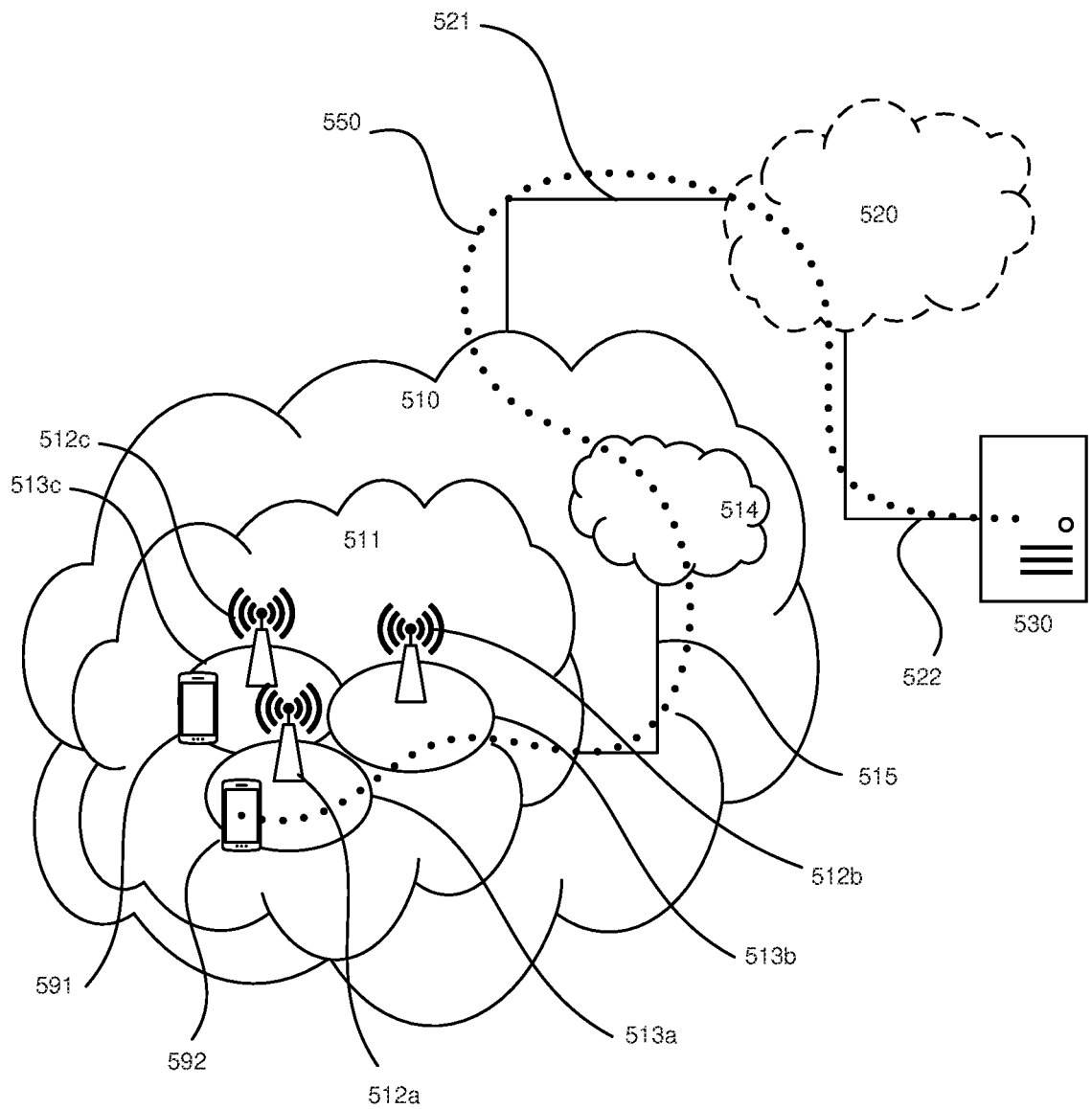
FIG. 5 schematically illustrates a telecommunication network connected via an intermediate network to a host computer.

With reference to FIG. 5, in accordance with an embodiment, a communication system includes telecommunication network 510, such as a 3GPP-type cellular network, which comprises access network 511, such as a radio access network, and core network 514. Access network 511 comprises a plurality of base stations 512a, 512b, 512c, such as NBs, eNBs, gNBs or other types of wireless access points, each defining a corresponding coverage area 513a, 513b, 513c. Each base station 512a, 512b, 512c is connectable to core network 514 over a wired or wireless connection 515. A first UE 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512.

Telecommunication network 510 is itself connected to host computer 530, which may be embodied in the hardware and/or software of a standalone server, a cloud-implemented server, a distributed server or as processing resources in a server farm. Host computer 530 may be under the ownership or control of a service provider, or may be operated by the service provider or on behalf of the service provider. Connections 521 and 522 between telecommunication network 510 and host computer 530 may extend directly from core network 514 to host computer 530 or may go via an optional intermediate network 520. Intermediate network 520 may be one of, or a combination of more than one of, a public, private or hosted network; intermediate network 520, if any, may be a backbone network or the Internet; in particular, intermediate network 520 may comprise two or more sub-networks (not shown).

The communication system of FIG. 5 as a whole enables connectivity between the connected UEs 591, 592 and host computer 530. The connectivity may be described as an over-the-top (OTT) connection 550. Host computer 530 and the connected UEs 591, 592 are configured to communicate data and/or signaling via OTT connection 550, using access network 511, core network 514, any intermediate network 520 and possible further infrastructure (not shown) as intermediaries. OTT connection 550 may be transparent in the sense that the participating communication devices through which OTT connection 550 passes are unaware of routing of uplink and downlink communications. For example, base station 512 may not or need not be informed about the past routing of an incoming downlink communication with data originating from host computer 530 to be forwarded (e.g., handed over) to a connected UE 591. Similarly, base station 512 need not be aware of the future routing of an outgoing uplink communication originating from the UE 591 towards the host computer 530.

Example implementations, in accordance with an embodiment, of the UE, base station and host computer discussed in the preceding paragraphs will now be described with reference to FIG. 6. In communication system 600, host computer 610 comprises hardware 615 including communication interface 616 configured to set up and maintain a wired or wireless connection with an interface of a different communication device of communication system 600. Host computer 610 further comprises processing circuitry 618, which may have storage and/or processing capabilities. In particular, processing circuitry 618 may comprise one or more programmable processors, application-specific integrated circuits, field programmable gate arrays or combinations of these (not shown) adapted to execute instructions. Host computer 610 further comprises software 611, which is stored in or accessible by host computer 610 and executable by processing circuitry 618. Software 611 includes host application 612. Host application 612 may be operable to provide a service to a remote user, such as UE 630 connecting via OTT connection 650 terminating at UE 630 and host computer 610. In providing the service to the remote user, host application 612 may provide user data which is transmitted using OTT connection 650.

Communication system 600 further includes base station 620 provided in a telecommunication system and comprising hardware 625 enabling it to communicate with host computer 610 and with UE 630. Hardware 625 may include communication interface 626 for setting up and maintaining a wired or wireless connection with an interface of a different communication device of communication system 600, as well as radio interface 627 for setting up and maintaining at least wireless connection 670 with UE 630 located in a coverage area (not shown in FIG. 6) served by base station 620.

Communication interface 626 may be configured to facilitate connection 660 to host computer 610. Connection 660 may be direct or it may pass through a core network (not shown in FIG. 6) of the telecommunication system and/or through one or more intermediate networks outside the telecommunication system. In the embodiment shown, hardware 625 of base station 620 further includes processing circuitry 628, which may comprise one or more programmable processors, application-specific integrated circuits, field programmable gate arrays or combinations of these (not shown) adapted to execute instructions. Base station 620 further has software 621 stored internally or accessible via an external connection.

Communication system 600 further includes UE 630 already referred to. Its hardware 635 may include radio interface 637 configured to set up and maintain wireless connection 670 with a base station serving a coverage area in which UE 630 is currently located. Hardware 635 of UE 630 further includes processing circuitry 638, which may comprise one or more programmable processors, application-specific integrated circuits, field programmable gate arrays or combinations of these (not shown) adapted to execute instructions. UE 630 further comprises software 631, which is stored in or accessible by UE 630 and executable by processing circuitry 638. Software 631 includes client application 632. Client application 632 may be operable to provide a service to a human or non-human user via UE 630, with the support of host computer 610. In host computer 610, an executing host application 612 may communicate with the executing client application 632 via OTT connection 650 terminating at UE 630 and host computer 610. In providing the service to the user, client application 632 may receive request data from host application 612 and provide user data in response to the request data. OTT connection 650 may transfer both the request data and the user data. Client application 632 may interact with the user to generate the user data that it provides.

Figure 6:
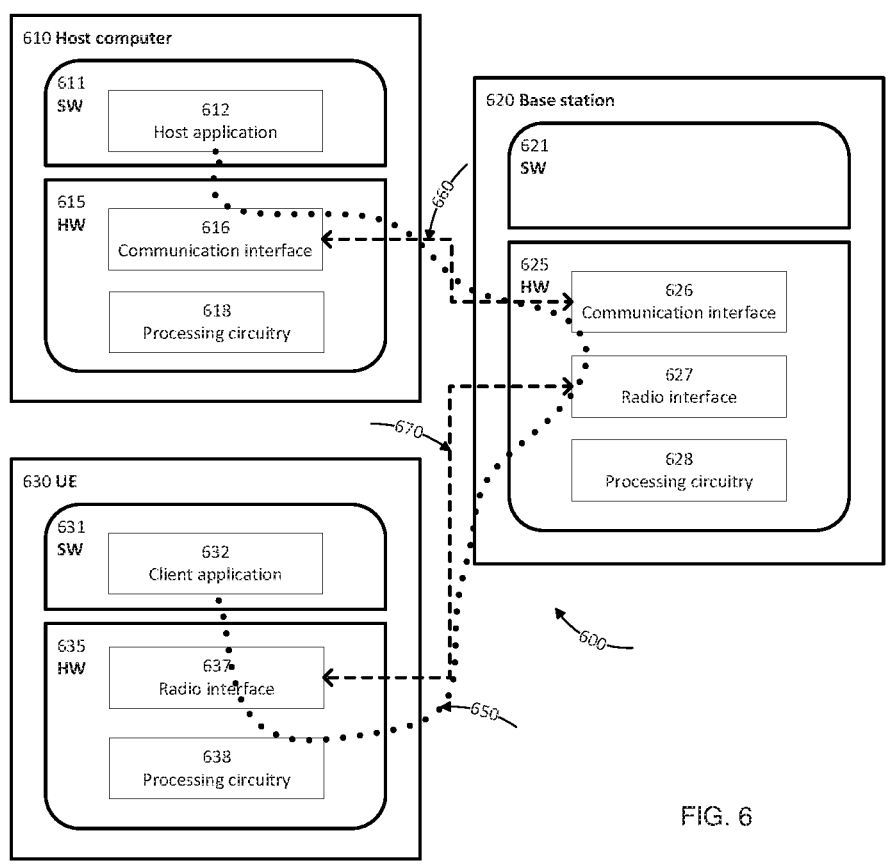
FIG. 6 is a generalized block diagram of a host computer communicating via a base station with a user equipment over a partially wireless connection.

It is noted that host computer 610, base station 620 and UE 630 illustrated in FIG. 6 may be similar or identical to host computer 530, one of base stations 512*a*, 512*b*, 512*c* and one of UEs 591, 592 of FIG. 5, respectively. This is to say, the inner workings of these entities may be as shown in FIG. 6 and independently, the surrounding network topology may be that of FIG. 5.

In FIG. 6, OTT connection 650 has been drawn abstractly to illustrate the communication between host computer 610 and UE 630 via base station 620, without explicit reference to any intermediary devices and the precise routing of messages via these devices. Network infrastructure may determine the routing, which it may be configured to hide from UE 630 or from the service provider operating host computer 610, or both. While OTT connection 650 is active, the network infrastructure may further take decisions by which it dynamically changes the routing (e.g., on the basis of load balancing consideration or reconfiguration of the network).

Wireless connection 670 between UE 630 and base station 620 is in accordance with the teachings of the embodiments described throughout this disclosure. One or more of the various embodiments improve the performance of OTT services provided to UE 630 using OTT connection 650, in which wireless connection 670 forms the last segment. More precisely, the teachings of these embodiments may improve network performance by enabling a TRP (e.g., base station) to transmit a beam indication (e.g., a QRI) in a downlink control message to a UE, which is configured to use the beam indication to choose an uplink power control loop, thereby providing benefits such as reduced overheard, reduced latency, improved received signal quality.

A measurement procedure may be provided for the purpose of monitoring data rate, latency and other factors on which the one or more embodiments improve. There may further be an optional network functionality for reconfiguring OTT connection 650 between host computer 610 and UE 630, in response to variations in the measurement results. The measurement procedure and/or the network functionality for reconfiguring OTT connection 650 may be implemented in software 611 and hardware 615 of host computer 610 or in software 631 and hardware 635 of UE 630, or both. In embodiments, sensors (not shown) may be deployed in or in association with communication devices through which OTT connection 650 passes; the sensors may participate in the measurement procedure by supplying values of the monitored quantities exemplified above, or supplying values of other physical quantities from which software 611, 631 may compute or estimate the monitored quantities. The reconfiguring of OTT connection 650 may include message format, retransmission settings, preferred routing etc.; the reconfiguring need not affect base station 620, and it may be unknown or imperceptible to base station 620. Such procedures and functionalities may be known and practiced in the art. In certain embodiments, measurements may involve proprietary UE signaling facilitating host computer 610's measurements of throughput, propagation times, latency and the like. The measurements may be implemented in that software 611 and 631 causes messages to be transmitted, in particular empty or 'dummy' messages, using OTT connection 650 while it monitors propagation times, errors etc.

Figure 7:
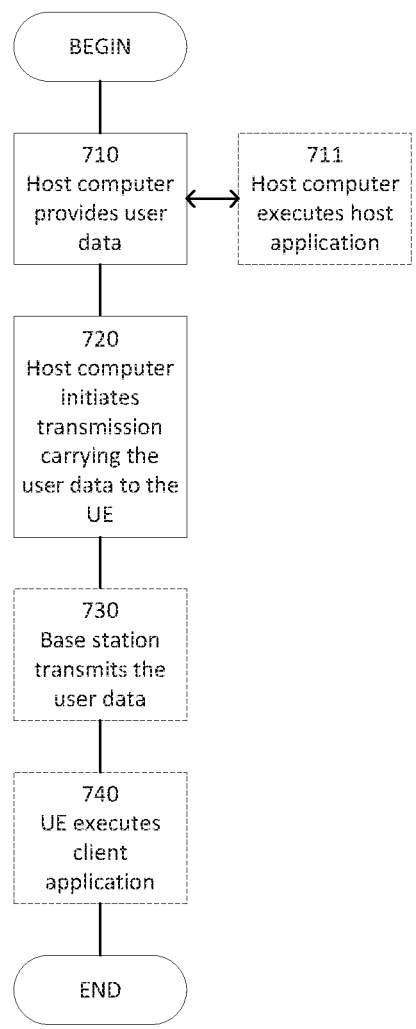
FIG. 7 is a flowchart illustrating a method implemented in a communication system including a host computer, a base station and a user equipment.

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In step 710, the host computer provides user data. In substep 711 (which may be optional) of step 710, the host computer provides the user data by executing a host application. In step 720, the host computer initiates a transmission carrying the user data to the UE. In step 730 (which may be optional), the base station transmits to the UE the user data which was carried in the transmission that the host computer initiated, in accordance with the teachings of the embodiments described throughout this disclosure. In step 740 (which may also be optional), the UE executes a client application associated with the host application executed by the host computer.

Figure 8:
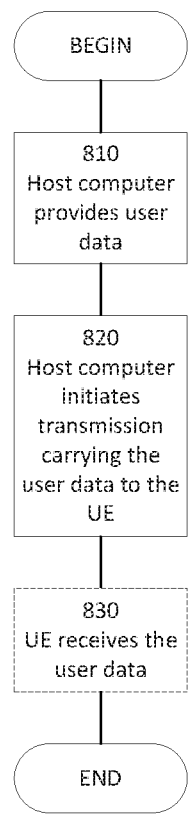
FIG. 8 is a flowchart illustrating a method implemented in a communication system including a host computer, a base station and a user equipment.

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In step 810 of the method, the host computer provides user data. In an optional substep (not shown) the host computer provides the user data by executing a host application. In step 820, the host computer initiates a transmission carrying the user data to the UE. The transmission may pass via the base station, in accordance with the teachings of the embodiments described throughout this disclosure. In step 830 (which may be optional), the UE receives the user data carried in the transmission.

Figure 9:
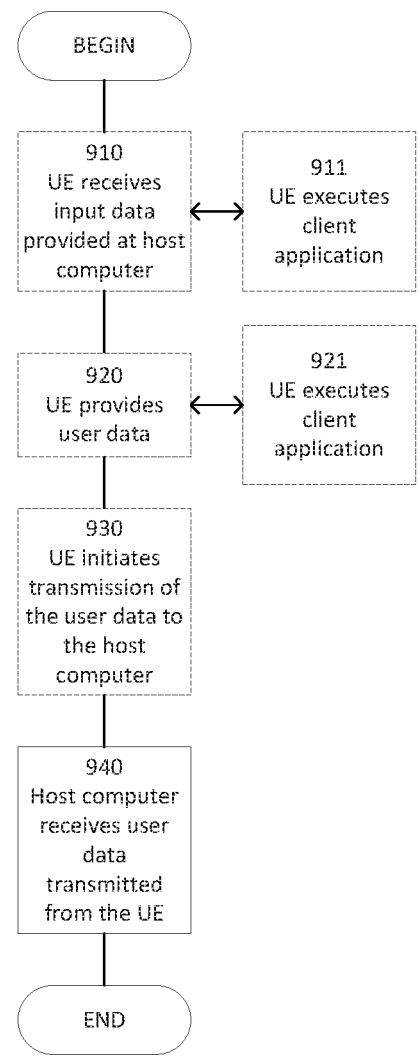
FIG. 9 is a flowchart illustrating a method implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 9 will be included in this section. In step 910 (which may be optional), the UE receives input data provided by the host computer. Additionally or alternatively, in step 920, the UE provides user data. In substep 921 (which may be optional) of step 920, the UE provides the user data by executing a client application. In substep 911 (which may be optional) of step 910, the UE executes a client application which provides the user data in reaction to the received input data provided by the host computer. In providing the user data, the executed client application may further consider user input received from the user. Regardless of the specific manner in which the user data was provided, the UE initiates, in substep 930 (which may be optional), transmission of the user data to the host computer. In step 940 of the method, the host computer receives the user data transmitted from the UE, in accordance with the teachings of the embodiments described throughout this disclosure.

Figure 10:
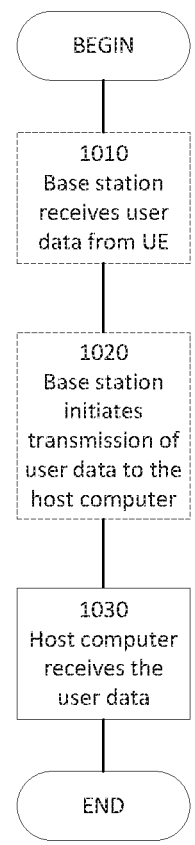
FIG. 10 is a flowchart illustrating a method implemented in a communication system including a host computer, a base station and a user equipment.

FIG. 10 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 10 will be included in this section. In step 1010 (which may be optional), in accordance with the teachings of the embodiments described throughout this disclosure, the base station receives user data from the UE. In step 1020 (which may be optional), the base station initiates transmission of the received user data to the host computer. In step 1030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 11:
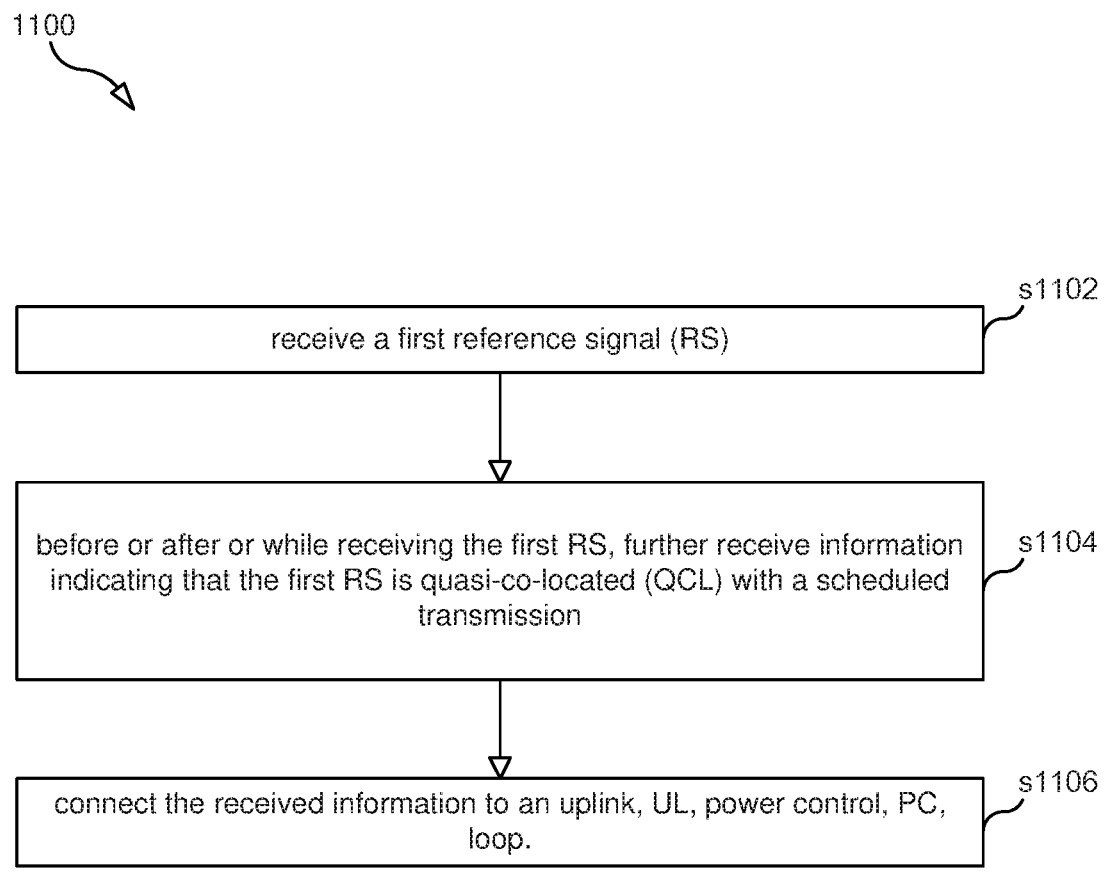
FIG. 11 is a flowchart illustrating a method implemented in a communication system including a host computer, a base station and a user equipment.

FIG. 11 depicts a method in accordance with particular embodiments, the method begins at step s1102 with receiving a first reference signal (RS). At step s1104, before or after or while receiving the first RS, the method includes receiving information indicating that the first RS is quasi-co-located (QCL) with a scheduled transmission. In some embodiments, the received information may be an indicator state. At step s1106, the method includes connecting the received information to an uplink, UL, power control, PC, loop. In some embodiments, the term connecting may comprise associating the received information to an UL PC loop.

Figure 12:
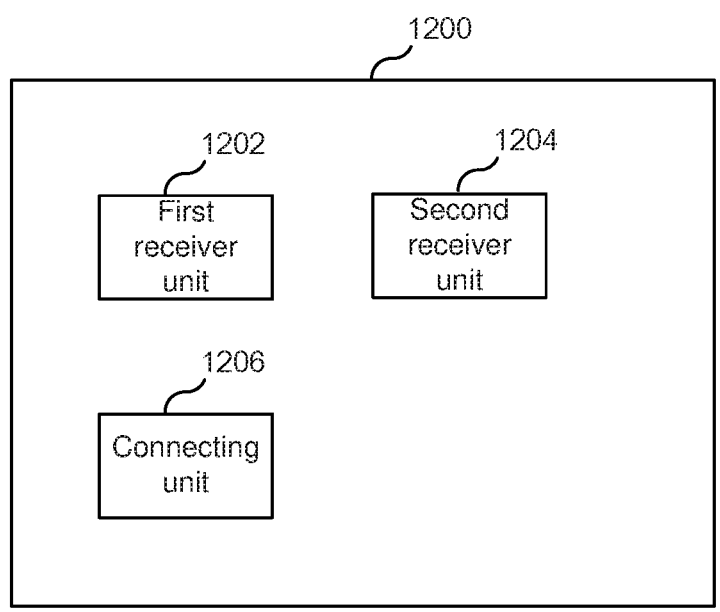
FIG. 12 illustrates a schematic block diagram of an apparatus in a wireless network.

FIG. 12 illustrates a schematic block diagram of an apparatus 1200 in a wireless network (for example, the wireless network shown in FIG. 2). The apparatus may be implemented in a wireless device or network node (e.g., wireless device 210 or network node 260 shown in FIG. 2). Apparatus 1200 is operable to carry out the example method described with reference to FIG. 11 and possibly any other processes or methods disclosed herein. It is also to be understood that the method of FIG. 11 is not necessarily carried out solely by apparatus 1200. At least some operations of the method can be performed by one or more other entities.

Virtual Apparatus 1200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the first receiver unit 1202 to receive a first reference signal, RS, the second receiver unit 1204 to before or after or while receiving the first RS, further receive information indicating that the first RS is quasi-co-located, QCL, with a scheduled transmission, and the connecting unit 1206 to connect the received information to an uplink, UL, power control, PC, loop, and any other suitable units of apparatus 1200 to perform corresponding functions according one or more embodiments of the present disclosure.

As illustrated in FIG. 12, apparatus 1200 includes first receiver unit 1202, second receiver unit 1204, and a connecting unit 1206, the first receiver unit 1202 configured to receive a first reference signal, RS, the second receiver unit 1204 configured to before or after or while receiving the first RS, further receive information indicating that the first RS is quasi-co-located, QCL, with a scheduled transmission, and the connecting unit 1206 configured to connect the received information to an uplink, UL, power control, PC, loop.

Figure 13:
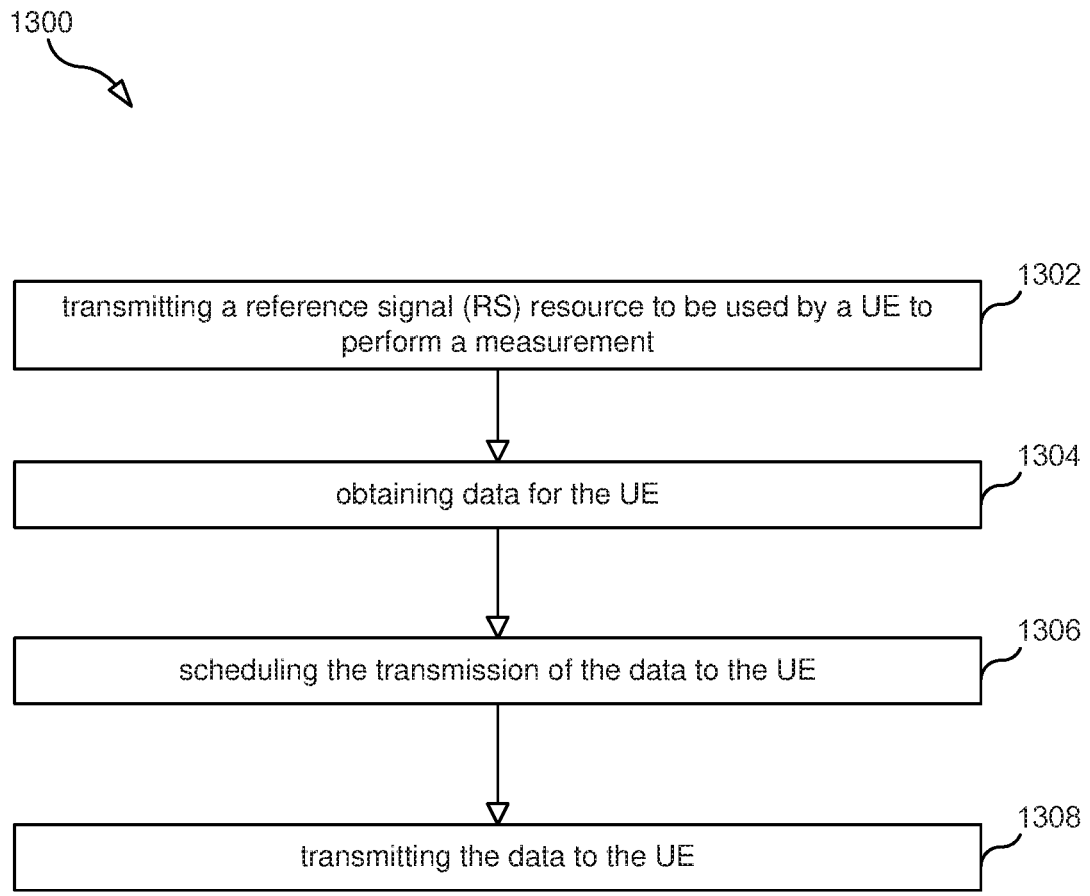
FIG. 13 is a flowchart illustrating a method implemented in a communication system including a host computer, a base station and a user equipment.

FIG. 13 depicts a method in accordance with particular embodiments, the method begins at step 1302 with transmitting a reference signal (RS) resource to be used by a UE to perform a measurement. At step 1304, the method includes obtaining data for the UE. At step 1306, the method includes scheduling the transmission of the data to the UE. At step 1308, the method includes transmitting the data to the UE. In some embodiments, scheduling the transmission of the data to the UE comprises transmitting a control message (e.g., a DCI or a MAC-CE) to the UE, the control message comprising information informing the UE that the previously transmitted RS resource is QCL with a second RS resource, wherein the information comprises a QCL Reference Indicator (QRI) for enabling the UE to connect the received information to an uplink, UL, power control, PC, loop.

Figure 14:
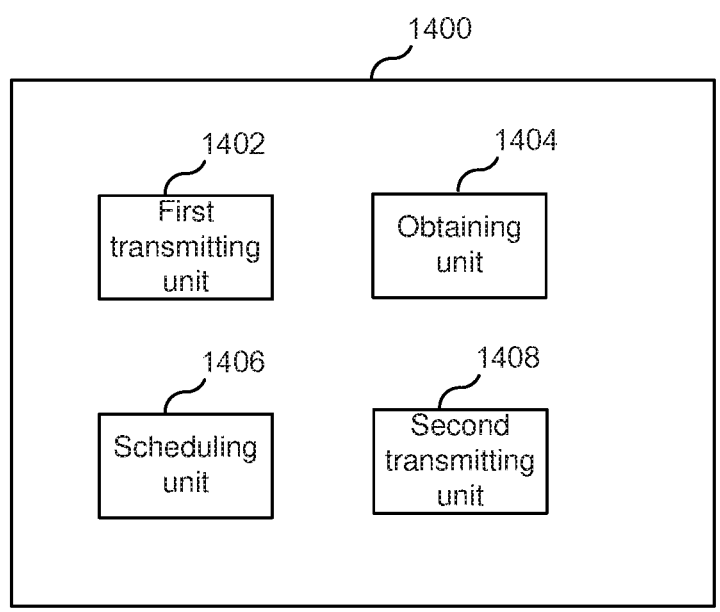
FIG. 14 illustrates a schematic block diagram of an apparatus in a wireless network.

FIG. 14 illustrates a schematic block diagram of an apparatus 1400 in a wireless network (for example, the wireless network shown in FIG. 2). The apparatus may be implemented in a wireless device or network node (e.g., wireless device 210 or network node 260 shown in FIG. 2). Apparatus 1400 is operable to carry out the example method described with reference to FIG. 13 and possibly any other processes or methods disclosed herein. It is also to be understood that the method of FIG. 13 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the first transmitting unit 1402 to transmit a reference signal (RS) resource to be used by a UE to perform a measurement, the obtaining unit 1404 configured to obtain data for the UE, the scheduling unit 1406 configured to schedule the transmission of the data to the UE, the second transmitting unit 1408 configured to transmit the data to the UE, wherein scheduling the transmission of the data to the UE comprises transmitting a control message (e.g., a DCI or a MAC-CE) to the UE, the control message comprising information informing the UE that the previously transmitted RS resource is QCL with a second RS resource wherein the information comprises a QCL Reference Indicator (QRI) for enabling the UE to connect the received information to an uplink, UL, power control, PC, loop, and any other suitable units of apparatus 1400 to perform corresponding functions according one or more embodiments of the present disclosure.

As illustrated in FIG. 14, apparatus 1400 includes first transmitting unit 1402, obtaining unit 1404, second transmitting unit 1408, and a scheduling unit 1406, the first transmitting unit 1402 configured to transmit a reference signal (RS) resource to be used by a UE to perform a measurement, the obtaining unit 1404 configured to obtain data for the UE, the scheduling unit 1406 configured to to schedule the transmission of the data to the UE, and the second transmitting unit 1408 configured to transmit the data to the UE, wherein scheduling the transmission of the data to the UE comprises transmitting a control message (e.g., a DCI or a MAC-CE) to the UE, the control message comprising information informing the UE that the previously transmitted RS resource is QCL with a second RS resource, wherein the information comprises a QCL Reference Indicator (QRI) for enabling the UE to connect the received information to an uplink, UL, power control, PC, loop.

Figure 15:
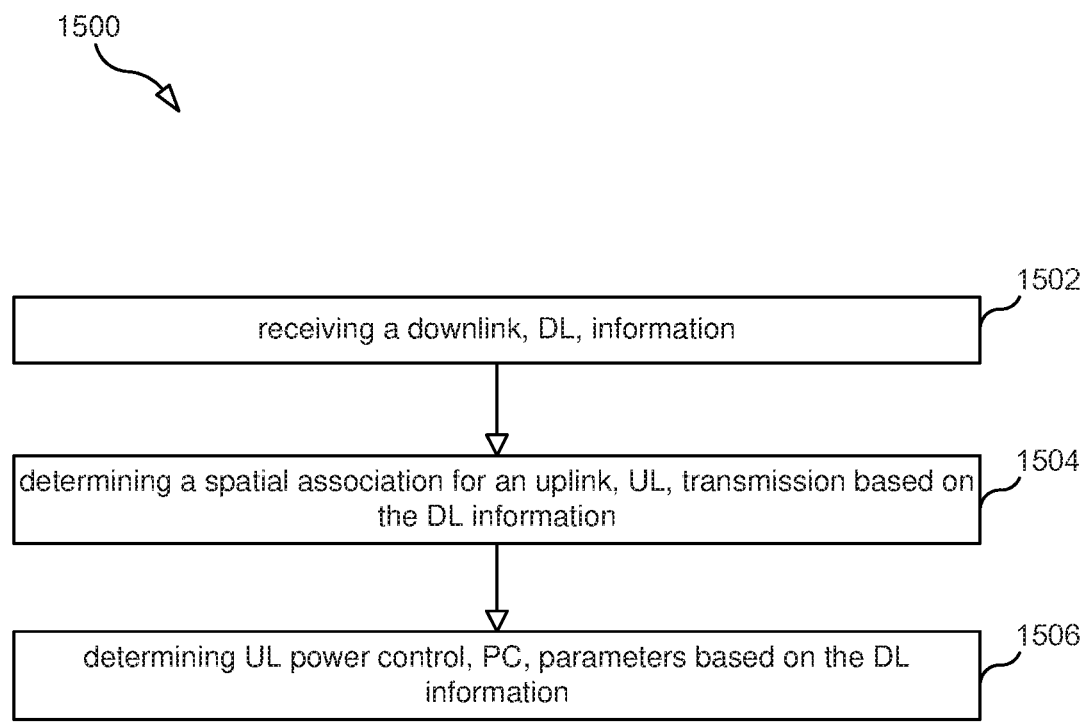
FIG. 15 is a flowchart illustrating a method implemented in a communication system including a host computer, a base station and a user equipment.

FIG. 15 depicts a method in accordance with particular embodiments, the method begins at step 1502 with receiving a downlink, DL, information. At step 1504, the method includes determining a spatial association for an uplink, UL, transmission based on the DL information. At step 1506, the method includes determining UL power control, PC, parameters based on the DL information.

In some embodiments, determining the spatial association comprises determining one of a) a spatial filter b) a precoder c) a beam used for the UL transmission.

In some embodiments, determining the spatial association further comprises determining a spatial association with a first reference signal, RS, configuration, based on the DL information.

In some embodiments, the first RS configuration is an uplink (UL) Sounding Reference Signal (SRS) configuration.

In some embodiments, the first RS configuration is a downlink (DL) RS configuration.

In some embodiments, the DL RS configuration includes one of a) a CSI-RS index or b) a SSB index.

In some embodiments, determining PC parameters comprises determining an offset value (P0) for UL power control.

In some embodiments, determining PC parameters comprises determining a RS used for path loss estimation.

In some embodiments, the DL information is a bitfield in Downlink Control Information, DCI, received using a Physical Downlink Control Channel, PDCCH.

In some embodiments, the DL information is a bitfield in a MAC CE.

In some embodiments, the bitfield is Sounding Reference Signal Indicator, SRI, in DCI received using the PDCCH.

In some embodiments, the method further includes the step of obtaining the transmit power for a PUSCH transmission based on the UL PC parameters.

In some embodiments, the method further includes the step of obtaining the transmit power for a PUCCH transmission based on the UL PC parameters.

In some embodiments, determining PC parameters comprises determining an alpha value and/or a loop index value, wherein, optionally, the alpha value and/or the loop index value are beam specific.

In some embodiments, the DL information comprises a Sounding Reference Signal (SRS) indicator, SRI, representing a SRI state selected from a set of available SRI states.

In some embodiments, each of the available SRI states is associated with one or more DL RSs.

In some embodiments, determining the PC parameters comprises determining the UL PC parameters associated with the SRI.

Figure 16:
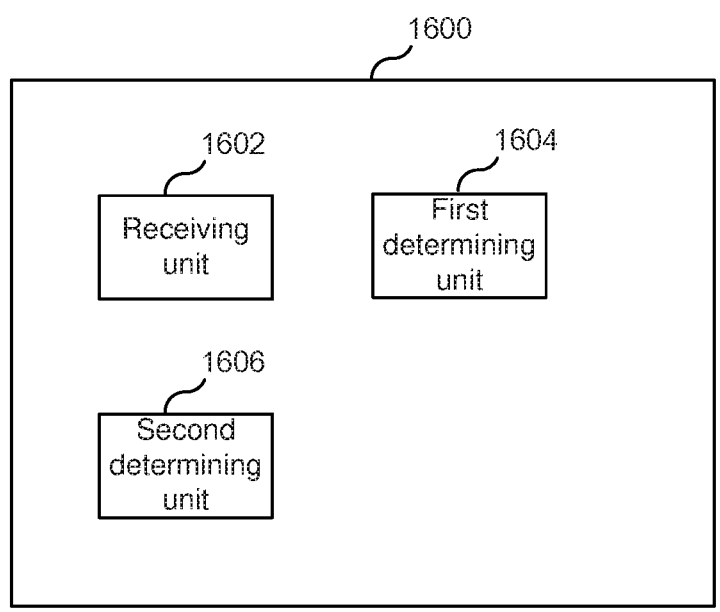
FIG. 16 illustrates a schematic block diagram of an apparatus in a wireless network.

FIG. 16 illustrates a schematic block diagram of an apparatus 1600 in a wireless network (for example, the wireless network shown in FIG. 2). The apparatus may be implemented in a wireless device or network node (e.g., wireless device 210 or network node 260 shown in FIG. 2). Apparatus 1600 is operable to carry out the example method described with reference to FIG. 15 and possibly any other processes or methods disclosed herein. It is also to be understood that the method of FIG. 15 is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the receiving unit 1602 to receive a downlink, DL, information, the first determining unit 1604 configured to determine a spatial association for an uplink, UL, transmission based on the DL information, the second determining unit 1606 configured to determine UL power control, PC, parameters based on the DL information, and any other suitable units of apparatus 1600 to perform corresponding functions according one or more embodiments of the present disclosure.

As illustrated in FIG. 16, apparatus 1600 includes receiving unit 1602, first determining unit 1604, and second determining unit 1606, the receiving unit 1602 configured to receive a downlink, DL, information, the first determining unit 1604 configured to determine a spatial association for an uplink, UL, transmission based on the DL information, and the second determining unit 1606 configured to determine UL power control, PC, parameters based on the DL information.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

Group A Embodiments

A1. A method implemented in a wireless device, comprising:
receiving a first reference signal, RS;
before or after or while receiving the first RS, further receiving information indicating that the first RS is quasi-co-located, QCL, with a scheduled transmission; and
connecting the received information to an uplink, UL, power control, PC, loop.

A2. The method of embodiment A1, wherein connecting the received information to an UL PC loop comprises using the received information to select the UL PC loop from a plurality of UL PC loops.

A3. The method of any of the preceding embodiments, wherein the received information comprises a quasi-co-location (QCL) indicator, QRI, representing a QRI state selected from a set of available QRI states.

A4. The method of any of the preceding embodiments, wherein the received information comprises a sounding reference signal (SRS) indicator, SRI, representing a SRI state selected from a set of available SRI states.

A5. The method of embodiment A3, wherein each of the available QRI states is connected to an UL Power Control loop.

A6. The method of embodiment A3, wherein each of the available QRI states is connected to an RS type.

A7. The method of embodiment A6, the method further comprising:
conducting path loss estimation based on the RS type connected to the corresponding QRI state.

A8. The method of embodiment A6, the method further comprising:
conducting path loss estimation based on a RS type which is not connected to the corresponding QRI state.

A9. The method of embodiment A3, the method further comprising:
determining transmit power for a PUSCH based on a plurality of power control parameters associated with the UL Power Control loop.

A10. The method of embodiment A9, wherein the plurality of power control parameters comprises: (i) an RS type connected to the QRI used for path loss estimation and (ii) an offset value.

A11. The method of embodiment A3, the method further comprising:
determining transmit power for a PUCCH based on a plurality of power control parameters associated with the UL Power Control loop.

A12. The method of embodiment A11, wherein the plurality of power control parameters comprises: (i) an RS type connected to the QRI used for path loss estimation and (ii) an offset value.

A13. The method of embodiment A6, the method further comprising:
transmitting a power headroom report regarding the UL Power Control loop, wherein the report comprises an indication of the QRI state.

A14. The method of embodiment A6, wherein at least one periodic RS type and at least one aperiodic RS type is configurable as the RS type.

A15. The method of embodiment A13 or A6, wherein at least one QRI state in the set of available QRI states is associated with a periodic RS type and at least one QRI state in the same set is associated with an aperiodic RS type.

A16. The method of embodiment A6, A14 or A15, wherein one or more of the QRIs states in the set of available QRI states is further associated with an RS index, RSI, identifying a transmission of an RS of the RS type with which the QRI state is associated.

A17. The method of embodiment A16, the RSI identifying a unique complete transmission of an RS of the RS type which is associated with the QRI state.

A18. The method of embodiment A16 or A17, wherein the set of available QRI states includes one or more of:
a QRI state associated with an explicitly signaled RSI;
a QRI state associated with an implicitly signaled RSI.

A19. The method of embodiment A13, wherein
each QRI state in the set of available QRI states is associated with a periodic RS type, or each QRI state in the set of available QRI states is associated with an aperiodic RS type.

A20. The method of any of the preceding embodiments, further comprising:

the wireless device storing mapping information that i) associates a first QRI with a first receiver configuration and ii) associates a second QRI to a second receiver configuration, wherein the information indicating that the first reference signal is QCL with the scheduled transmission comprises one of the QRIs.

A21. The method of embodiment A20, wherein the wireless device stores information associating the first receiver configuration with a first RSI, the wireless device stores information associating the second receiver configuration with a second RSI, the mapping information associates the first QRI with the first receiver configuration by associating the first QRI with the first RSI, and the mapping information associates the second QRI with the second receiver configuration by associating the second QRI with the second RSI.

A22. The method of embodiment A21, wherein the mapping information comprises a table that associates the first QRI with the first RSI and associates the second QRI with the second RSI.

A23. The method of any of embodiments A16, A17, A18, A19, and A20, wherein the first RSI comprises at least one of:

a time index (e.g., a slot index, a frame index);

a CSI-RS resource index, CRI;

an SS block (SSB) index.

A24. The method of any of embodiments A20, A21, and A22, further comprising prior to the wireless device storing the mapping information, the wireless device receives QRI information associating the first QRI to a first RS type and associating the second QRI to a second RS type.

A25, The method of embodiment A24, wherein the first RS type is a periodic RS type (e.g., SSB, p-CSI-RS) and the second RS type is an aperiodic RS type (e.g., a-CSI-RS), the first RS type is a periodic RS type and the second RS type is a periodic RS type, or the first RS type is an aperiodic RS type and the second RS type is an aperiodic RS type.

A26. The method of embodiment A24 or A25, wherein the QRI information further comprises one of:

a first indicator (e.g., "explicit" or 0) indicating that a network node will provide to the wireless device an RSI to which the first QRI should associated, and a second indicator (e.g., "implicit" or 1) indicating that the wireless device should itself determine the RSI to which the first QRI should associated.

A27. The method of embodiment A26, wherein the QRI information further comprises one of:

a third indicator (e.g., "explicit" or 0) indicating that a network node will provide to the wireless device an RSI to which the second QRI should associated, and a fourth indicator (e.g., "implicit" or 1) indicating that the wireless device should itself determine the RSI to which the second QRI should associated.

A28. The method of any of the preceding embodiments, wherein the information is received in one or more of:

a scheduling message, a layer-2 message, a random access response message,

DCI,

MAC-CE,

RRC.

A29. The method of any one of embodiments A8 and A15, further comprising:

the wireless device receiving information for triggering the UE to perform measurements with respect to a set of RS transmissions, the triggering information comprising a QRI;

the wireless device selecting receiver configuration based on the measurements; and the wireless device storing information associating the QRI with the selected receiver configuration.

Group B Embodiments

B1. A method performed by an access network for providing m indications to a wireless device, the method comprising:

transmitting a reference signal (RS) resource to be used by a UE to perform a measurement;

obtaining data for the UE;

scheduling the transmission of the data to the UE; and transmitting the data to the UE, wherein scheduling the transmission of the data to the UE comprises transmitting a control message (e.g., a DCI or a MAC-CE) to the UE, the control message comprising information informing the UE that the previously transmitted RS resource is QCL with a second RS resource, wherein the information comprises a QCL Reference Indicator (QRI) for enabling the UE to connect the received information to an uplink, UL, power control, PC, loop.

B2. The method of embodiment B1, wherein the information QRI represents a QRI state selected from a set of available QRI states.

B3. The method of embodiment B1, wherein the QRI is 2 or 3 bits in length.

Group C Embodiments

C1. A wireless device, the wireless device comprising:
processing circuitry configured to perform any of the steps of any of the Group A embodiments; and
power supply circuitry configured to supply power to the wireless device.

C2. A base station, the base station comprising:
processing circuitry configured to perform any of the steps of any of the Group B embodiments;
power supply circuitry configured to supply power to the wireless device.

C3. A user equipment (UE) for, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

C4. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

C5. The communication system of the pervious embodiment further including the base station.

C6. The communication system of the previous 2 embodiments, further including the UE, wherein the UE is configured to communicate with the base station.

C7. The communication system of the previous 3 embodiments, wherein:
the processing circuitry of the host computer is configured to execute a host application, thereby providing the user data; and
the UE comprises processing circuitry configured to execute a client application associated with the host application.

C8. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

C9. The method of the previous embodiment, further comprising, at the base station, transmitting the user data.

C10. The method of the previous 2 embodiments, wherein the user data is provided at the host computer by executing a host application, the method further comprising, at the UE, executing a client application associated with the host application.

C11. A user equipment (UE) configured to communicate with a base station, the UE comprising a radio interface and processing circuitry configured to performs the of the previous 3 embodiments.

C12. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

C13. The communication system of the previous embodiment, wherein the cellular network further includes a base station configured to communicate with the UE.

C14. The communication system of the previous 2 embodiments, wherein:
the processing circuitry of the host computer is configured to execute a host application, thereby providing the user data; and
the UE's processing circuitry is configured to execute a client application associated with the host application.

C15. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

C16. The method of the previous embodiment, further comprising at the UE, receiving the user data from the base station.

C17. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

C18. The communication system of the previous embodiment, further including the UE.

C19. The communication system of the previous 2 embodiments, further including the base station, wherein the base station comprises a radio interface configured to communicate with the UE and a communication interface configured to forward to the host computer the user data carried by a transmission from the UE to the base station.

C20. The communication system of the previous 3 embodiments, wherein:
the processing circuitry of the host computer is configured to execute a host application; and
the UE's processing circuitry is configured to execute a client application associated with the host application, thereby providing the user data.

C21. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

C22. A method implemented in a communication system including a host computer, a base station and a user equipment (UE), the method comprising:
at the host computer, receiving user data transmitted to the base station from the UE, wherein the UE performs any of the steps of any of the Group A embodiments.

C23. The method of the previous embodiment, further comprising, at the UE, providing the user data to the base station.

C24. The method of the previous 2 embodiments, further comprising:
at the UE, executing a client application, thereby providing the user data to be transmitted; and
at the host computer, executing a host application associated with the client application.

C25. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.
C26. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
C27. The communication system of the previous embodiment further including the base station.
C28. The communication system of the previous 2 embodiments, further including the UE, wherein the UE is configured to communicate with the base station.
C29. The communication system of the previous 3 embodiments, wherein:
   the processing circuitry of the host computer is configured to execute a host application;
   the UE is configured to execute a client application associated with the host application, thereby providing the user data to be received by the host computer.
C30. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.
C31. The method of the previous embodiment, further comprising at the base station, receiving the user data from the UE.
C32. The method of the previous 2 embodiments, further comprising at the base station, initiating a transmission of the received user data to the host computer.

The U.S. provisional patent application to which this application claims priority (i.e., U.S. application No. 62/557,018, filed on Sep. 11, 2017) included an appendix that contained the text of two 3GPP contributions. Some relevant portions of the 3GPP contributions are reproduced here below:

Contribution 1

1. INTRODUCTION

In this contribution, a summary of a view on the Power Control (PC) framework in NR is provided.

2. DISCUSSION

In, for instance LTE release 10, the UE is initially performing PC for PRACH using $$P_{PRACH}=\min\{P_{CMAX,c}(i), PREAMBLE\_RECEIVED\_TARGET\_POWER+PL_c\},$$

After a connection is established between the UE and the eNodeB the UE can be configured for performing UL PC also on PUCCH, PUSCH and SRS. Setting the UE Transmit power for a physical uplink control channel (PUCCH) transmission is done from $$P_{PUCCH}=\min\{P_{CMAX,c}, P_{0,PUCCH}+PL_{DL}+V_{Format}+\delta\}$$

Here $P_{PUCCH}$ is the transmit power to use in a given subframe and $PL_{DL}$ is the pathloss estimated by the UE. For PUSCH one instead use the equation $$P_{PUSCH,c}=\min\{P_{CMAX,c}-P_{PUCCH}, P_{0,PUSCH}+\alpha PL_{DL}+10\log_{10}M+V_{MCS}+\delta\}$$

where c denotes the serving cell and $P_{PUSCH,c}$ is the transmit power to use in a given subframe. For SRS one defines $$P_{SRS,c}(i)=\min\{P_{CMAX,c}(i), P_{SRS\_OFFSET,c}(m)+10\log_{10}(M_{SRS,c})+P_{O\_PUSCH,c}(j)+\alpha_c(j)\cdot PL_c+f_c(i)\}.$$

For NR these designs need to be revisited.

2.1. Beam Specific PC in NR

In a companion contribution [1] a PC perspective is discussed in that, there will exist a framework in beam management for connecting a UE TX and gNB RX beam pair to a RS and an indicator state. There will also exist a way to communicate this indicator state to the UE from the gNB. Hence, these two abilities, introduced in beam management, does indeed relate to questions discussed in the area of PC and beam specific PC. Reusing this framework for PC would therefore avoid redundant signalling and based on this the following are proposed:

For PUCCH PC, utilize the N-bit indicator field which provides a reference to a DL RS which is spatially QCL'd with at least one PDSCH DMRS port group in order to define a corresponding beam specific PC-parameter-set For a PUSCH transmission, the beam specific PC-parameter-set that the UE uses to set its transmit power is determined from the implicit/explicit beam indication provided to the UE for that transmission.

Reuse the implicit/explicit beam indication mechanisms defined for beam management purposes for PC purposes as much as possible to avoid specifying redundant signalling.

2.2. Closed Loop PC in NR

The support of beam specific PC in NR raises the question whether also multiple closed loop processes should be active at the same time. This is discussed in companion contribution [2] and concluded in the following proposal Make a single closed loop process default and support multiple closed loop processes by configuration in case of beam specific PC.

Another important question for closed loop PC in NR is that new features introduced will imply that situations may occur when a TPC command has not been given in a long while. This may then lead to an outdated open loop if running in aggregated mode. This is analyzed in [2] and concluded in the following proposal Support explicit reset of the closed loop PC part in case of aggregated mode.

2.3. Power Headroom Reporting in NR

The introduction of beam specific power control will result in that the PHR framework needs to be adapted accordingly. Two solutions have been discussed:
   a) one PHR per beam, or
   b) PHR corresponds to the beam currently/last used for PUSCH The pros and cons of these two alternatives mote in [3] are discussed and the following are proposed In NR for beam specific power control PHR corresponds to the beam currently/last used for PUSCH Given that the PHR corresponds to the beam currently/last used for PUSCH the PHR triggering conditions from LTE are reused in NR 2.4. Service Type Specific UL PC There have been discussions on supporting service type specific PC by enabling for instance an extra power boost for a certain service type, for instance by setting a larger P0 for the PC-parameter-set used by this service type. This appears beneficial for in particular URLLC type of use cases and since this is an important use case for NR this should be found motivated. However, since RAN1 will not make a distinction on different service types this would in our view rather be a RAN2 matter since it relates to how to muxing different logical channels. Based on this the following are proposed:

Support service type specific UL power control.

If service type specific UL power control is supported send an LS to RAN2.

3. Conclusions

Based on the discussion in this contribution the following are proposed:

Proposal 1 For PUCCH PC, utilize the N-bit indicator field which provides a reference to a DL RS which is spatially QCL'd with at least one PDSCH DMRS port group in order to define a corresponding beam specific PC-parameter-set For a PUSCH transmission, the beam specific PC-parameter-set that the UE uses to set its transmit power is determined from the implicit/explicit beam indication provided to the UE for that transmission.

Reuse the implicit/explicit beam indication mechanisms defined for beam management purposes for PC purposes as much as possible to avoid specifying redundant signalling.

Proposal 5 Make a single closed loop process default and support multiple closed loop processes by configuration in case of beam specific PC.

Proposal 6 Support explicit reset of the closed loop PC part in case of aggregated mode.

Proposal 7 In NR for beam specific power control PHR corresponds to the beam currently/last used for PUSCH Proposal 8 Given that the PHR corresponds to the beam currently/last used for PUSCH the PHR triggering conditions from LTE are reused in NR Proposal 9 Support service type specific UL power control.

Proposal 10 If service type specific UL power control is supported send an LS to RAN2.

4. References

R1-1716607, "Beam specific PC in NR", Ericsson, 3GPP TSG-RAN WG1 NR Ad Hoc #3, Nagoya, Japan, 18-21, September 2017

R1-1716606, "Closed loop PC in NR", Ericsson, 3GPP TSG-RAN WG1 NR Ad Hoc #3, Nagoya, Japan, 18-21, September 2017

R1-1716605, "Power headroom reporting in NR", Ericsson, 3GPP TSG-RAN WG1 NR Ad Hoc #3, Nagoya, Japan, 18-21, September 2017

Second Contribution

1. INTRODUCTION

It has been agreed that NR supports beam specific power control. In our mind beam specific power control will enable use cases where separate power control in multiple UE TX and gNB RX beam pairs are maintained. Use cases include for instance A UE transmitting to a TRP using a certain beam switches to another beam and then consequently also switches from one set of PC parameters (PC-parameter-set, e.g. P0, alpha) to another.

A UE transmitting to a TRPs switches to another TRP and then consequently also switches from one PC-parameter-set to another.

The formula for beam specific PC, where PUSCH is used as an example, may be written as $$P_{PUSCH,c} = \min\{P_{CMAX,c} - P_{PUCCH}, P_{0,PUSCH}^i + \alpha_i PL_c^i + 10\log_{10} M + V_{MCS} + \delta\}.$$

Here the meaning of $\alpha_i$, $P_{0,PUSCH}^i$ etc. is that these parameters may be configured in a beam specific manner and may thus depend on a beam index i. They may however also be shared such that for instance $\alpha_0 = \alpha_1 = \ldots = \alpha_6 = \alpha$ meaning that only $\alpha$ needs to be configured, the discussion about these details are still ongoing. However, $PL_c^i$ implies that the path loss estimation is based on the reference signal corresponding to i. Based on this it is identified that at least two components need to be in place in order to enable beam specific PC:

a) A way to connect a certain RS to PC-parameter-set i, and b) A way, implicit or explicit, to signal to the UE which PC-parameter-set i to use when setting the output power $P_{PUSCH,c}$ n for a given PUSCH transmission.

A view of these two questions is provided in this contribution.

2.1 Beam Indication in Beam Management

Since the topic on beam specific PC is tightly connected to beam management it is essential to design the PC framework with the beam management framework in mind. In RAN1#90 (Prague), the following agreement was made related to DL beam indication for PDSCH:

Agreement #1:

For the purposes of beam indication for at least NR unicast PDSCH, support an N-bit indicator field in DCI which provides a reference to a DL RS which is spatially QCL'd with at least one PDSCH DMRS port group
    An indicator state is associated with at least one index of a DL RS (e.g., CRI, SSB Index) where each index of downlink RS can be associated with a given DL RS type, e.g., aperiodic CSI-RS, periodic CSI-RS, semi-persistent CSI-RS, or SSB,
       Note: L1-RSRP reporting on SSB is not yet agreed
       Note: One possibility to determine DL CSI-RS type is through the resource setting ID, other options are not precluded
    The value of N is FFS, but is at most [3] bits
    FFS: The case of more than one DMRS port group
    FFS: Whether or not to indicate more than one beam indicator, NR strive to minimize the indicator overhead
    FFS: Signalling mechanism for the association of a DL RS index (e.g., CRI, SSB index) to an indicator state, e.g.,
       The association is explicitly signaled to the UE
       The association is implicitly determined by the UE
       Combination of the above is not precluded This agreement establishes that an N-bit indicator field in DCI provides at least a spatial QCL reference to a DL RS (either CSI-RS or SSB) to aid in the demodulation of PDSCH. A given value of the indicator is referred to as an indicator state, and it is associated with an index of the DL RS (CRI or SSB Index). In the case of CSI-RS, the resource can be periodic, semi-persistent, or aperiodic. In this agreement, it is FFS how the DL RS index is associated with the indicator state, either through explicit signalling or implicitly during a UE measurement.

Clearly, the functionality supported by the N-bit indicator is analogous to PQI in LTE which is used for the purposes of QCL and PDSCH rate matching indication in DCI format 2D supporting CoMP operation. One point of difference, however, is that for NR it is not clear that it is necessary to signal PDSCH rate matching parameters in the same way. Furthermore, the indicator is not limited to the case of multi-TRP (CoMP) operation. Dynamic (spatial) QCL indication is beneficial even for single TRP mmWave operation. Hence, adopting a more general term for the N-bit indicator is proposed, namely Transmission Configuration Indicator (TCI) to capture the notion that the QCL configuration for a PDSCH transmission is indicated dynamically.

FIG. 17 shows an exemplary set of TCI states that may be RRC configured to a UE. With N-bits, up to 2N TCI states may be defined, some containing a single RS set and others containing multiple RS sets to support multi-TRP operation. In the case of basic single TRP operation, all TCI states would contain only a single RS set. A default TCI state is also shown which may be used, for example, for QCL indication referring to the SSB beam index determined by the UE during initial access. As discussed previously, different TCI states may be used for QCL indication referring to different RS types, i.e., SSB, periodic, semi-persistent, or aperiodic CSI-RS. It is up to the network implementation to configure the states depending on what mix of DL RSs are used for beam management. More details on this framework is provided in paper [1].

From a PC perspective, there will exist a framework for connecting a UE TX and gNB RX beam pair to a RS as well as a way to communicate this indicator state to the UE from the gNB. Hence, these two abilities, introduced in beam management, does indeed relate to questions discussed in the area of PC. For instance, in the case of UEs with beam correspondence, it makes sense that the UE should transmit in a reciprocal direction to the DL RSs which are used as a spatial QCL reference. Hence, the TCI defined and signalled for a DL transmission is suitable to reuse also for UL transmission. Thereby it would therefore also be beneficial to also attach the beam specific PC framework to this TCI; this would avoid redundant signalling since the PC-parameter-set index would be implicitly given by the TCI signalled for DL and/or UL transmissions. Based on this the following are proposed:

For PUCCH PC, utilize the N-bit indicator field which provides a reference to a DL RS which is spatially QCL'd with at least one PDSCH DMRS port group in order to define a corresponding beam specific PC-parameter-set.

For a PUSCH transmission, the beam specific PC-parameter-set that the UE uses to set its transmit power is determined from the implicit/explicit beam indication provided to the UE for that transmission.

Reuse the implicit/explicit beam indication mechanisms defined for beam management purposes for PC purposes as much as possible to avoid specifying redundant signalling.

3. CONCLUSIONS

The following short form proposals are provided:

Proposal 2 For PUCCH PC, utilize the N-bit indicator field which provides a reference to a DL RS which is spatially QCL'd with at least one PDSCH DMRS port group in order to define a corresponding beam specific PC-parameter-set For a PUSCH transmission, the beam specific PC-parameter-set that the UE uses to set its transmit power is determined from the implicit/explicit beam indication provided to the UE for that transmission.

Reuse the implicit/explicit mean indication mechanisms defined for beam management purposes for PC purposes as much as possible to avoid specifying redundant signalling.

4. REFERENCES

[1] R1-1716350 "On beam indication, measurement, and reporting", 3GPP TSG-RAN WG1 NR Ad Hoc #3

Abbreviations

At least some of the following abbreviations may be used in this disclosure. If there is an inconsistency between abbreviations, preference should be given to how it is used above. If listed multiple times below, the first listing should be preferred over any subsequent listing(s).
TRP Transmission Point
UE User Equipment
TX Transmission radio chain
RX Receiver radio chain
PUCCH Physical Uplink control channel
PDCCH Physical Downlink control channel
PDSCH Physical downlink shared data channel
PUSCH Physical uplink shared data channel
PBCH Physical broadcast channel
CSI-RS Channel state information reference signal
SSB Synchronization signal block
PSS Primary Synchronization Signal
SSS Secondary Synchronization Signal
DCI Downlink control information
MAC-CE MAC Control Element
QRI QCL Reference Indicator
RSI Reference Signal Index
SRS Sounding Reference Signal
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power ORnReference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wideband CDMA
WLAN Wireless Local Area Network

The invention claimed is:

1. A method implemented in a user equipment, UE, the method comprising:
receiving downlink (DL) information;
determining a spatial association for an uplink (UL) transmission based on the DL information, wherein determining the spatial association for the uplink (UL) transmission based on the DL information comprises, based on the DL information, determining a spatial filter for the UL transmission;
determining UL power control (PC) parameters based on the DL information; and
performing the UL transmission using the determined spatial filter and the UL PC parameters.

2. The method of claim 1, wherein determining the spatial association further comprises determining a spatial association with a first reference signal (RS) configuration based on the DL information.

3. The method of claim 2, wherein the first RS configuration is an UL Sounding Reference Signal (SRS) configuration.

4. The method of claim 2, wherein the first RS configuration is a DL RS configuration.

5. The method of claim 4, wherein the DL RS configuration comprises a) a CSI-RS index or b) a SSB index.

6. The method of claim 1, wherein determining the PC parameters comprises determining an offset value for UL power control.

7. A computer program product comprising a non-transitory computer readable medium storing a computer program comprising instructions which, when executed on at least one processor, cause the at least one processor to carry out the method of claim 1.

8. A user equipment, UE, the UE being configured to:
receive downlink (DL) information;
determine a spatial association for an uplink (UL) transmission based on the DL information, wherein determining the spatial association comprises determining a spatial filter for the UL transmission;
determine UL power control (PC) parameters based on the DL information; and
perform the UL transmission using the determined spatial filter and the UL PC parameters.

9. The UE of claim 8, wherein determining the spatial association further comprises determining a spatial association with a first reference signal (RS) configuration based on the DL information.

10. The UE of claim 9, wherein the first RS configuration is an UL Sounding Reference Signal (SRS) configuration.

11. The UE of claim 9, wherein the first RS configuration is a DL RS configuration.

12. The UE of claim 11, wherein the DL RS configuration comprises a) a CSI-RS index or b) a SSB index.

13. The UE of claim 8, wherein determining the PC parameters comprises determining an offset value for UL power control.

14. The UE of claim 8, wherein determining the PC parameters comprises determining a RS used for path loss estimation.

15. The UE of claim 8, wherein the DL information is a bitfield in Downlink Control Information (DCI) received using a Physical Downlink Control Channel (PDCCH).

16. The UE of claim 8, wherein the DL information is a bitfield in a MAC Control Element (CE).

17. The UE of claim 15, wherein the bitfield is Sounding Reference Signal Indicator (SIR) in DCI received using the PDCCH.

18. The UE of claim 8, wherein the UE is further configured to obtain the transmit power for a PUSCH transmission based on the UL PC parameters.

19. The UE of claim 8, wherein the UE is further configured to obtain the transmit power for a PUCCH transmission based on the UL PC parameters.

20. The UE of claim 8, wherein determining the PC parameters comprises determining an alpha value and/or a loop index value.

21. The UE of claim 8, wherein the DL information comprises a Sounding Reference Signal (SRS) indicator (SRI) representing a SRI state selected from a set of available SRI states.

22. The UE of claim 21, wherein each one of the available SRI states is associated with one or more DL RSs.

23. The UE of claim 21, wherein determining the PC parameters comprises determining the UL PC parameters associated with the SRI.

24. The UE of claim 8, the UE further configured to obtain the transmit power for a SRS transmission based on the UL PC parameters.

* * * * *